Aug. 31, 1943.  A. F. HANNEY  2,328,073
WASHING MACHINE FORMULA CONTROL
Filed Aug. 2, 1940  17 Sheets-Sheet 2

INVENTOR
ANGUS F. HANNEY
BY
Hyde and Meyer
ATTORNEYS

INVENTOR
ANGUS F. HANNEY
BY
Hyde and Meyer
ATTORNEYS

Aug. 31, 1943.  A. F. HANNEY  2,328,073
WASHING MACHINE FORMULA CONTROL
Filed Aug. 2, 1940   17 Sheets-Sheet 4

INVENTOR
ANGUS F. HANNEY
BY
*Hyde and Meyer*
ATTORNEYS

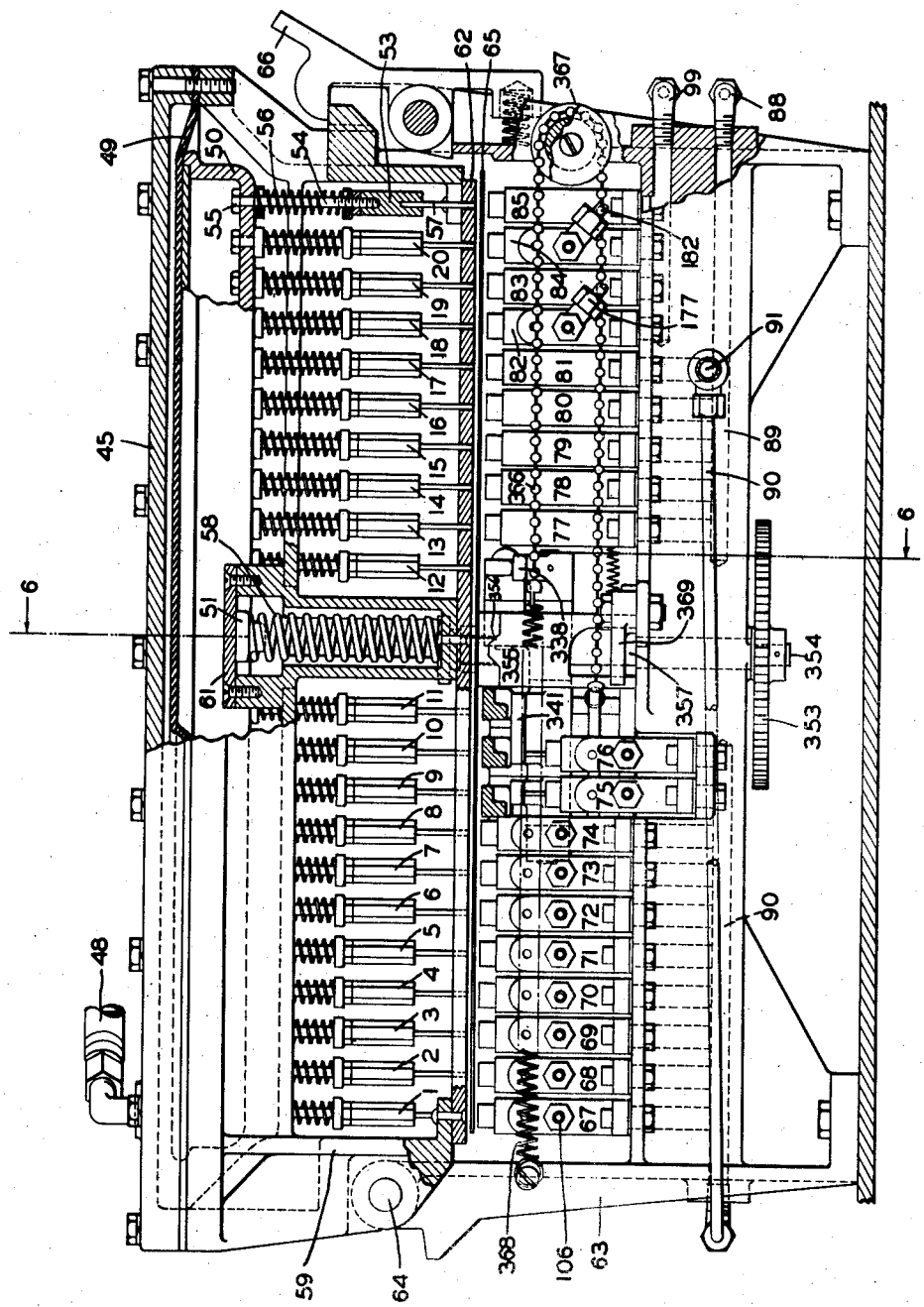

Aug. 31, 1943.  A. F. HANNEY  2,328,073
WASHING MACHINE FORMULA CONTROL
Filed Aug. 2, 1940  17 Sheets-Sheet 6
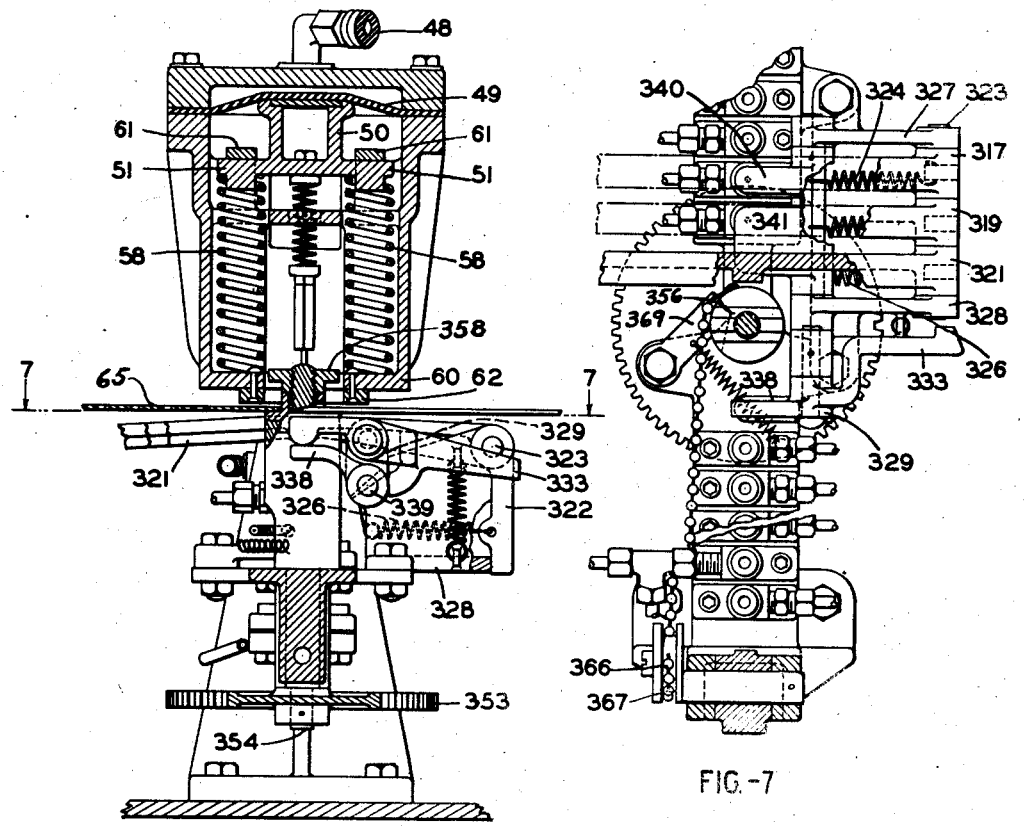
FIG.-6
FIG.-7
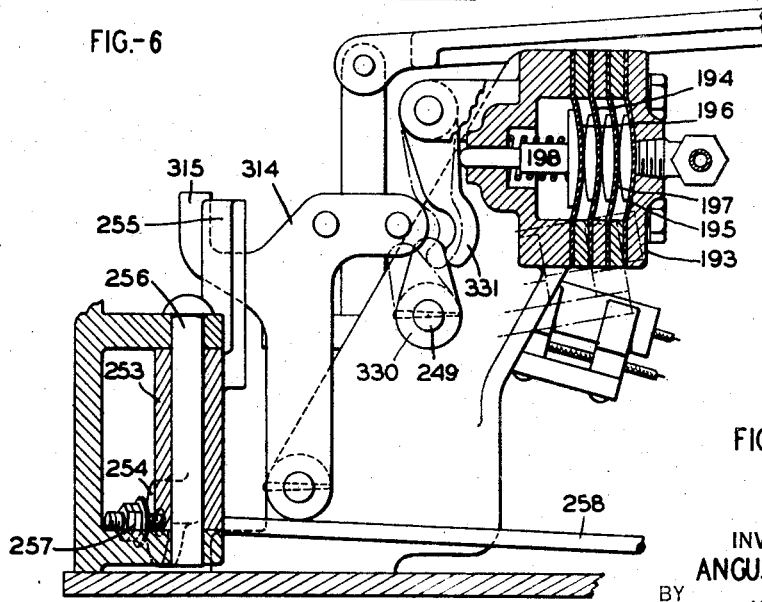
FIG.-8
INVENTOR
ANGUS F. HANNEY
BY Hyde and Meyer
ATTORNEYS Aug. 31, 1943.  A. F. HANNEY  2,328,073
WASHING MACHINE FORMULA CONTROL
Filed Aug. 2, 1940   17 Sheets-Sheet 7

INVENTOR
ANGUS F. HANNEY
BY
ATTORNEYS

Aug. 31, 1943.   A. F. HANNEY   2,328,073
WASHING MACHINE FORMULA CONTROL
Filed Aug. 2, 1940   17 Sheets-Sheet 9

INVENTOR
ANGUS F. HANNEY
BY
Hyde and Meyer
ATTORNEYS

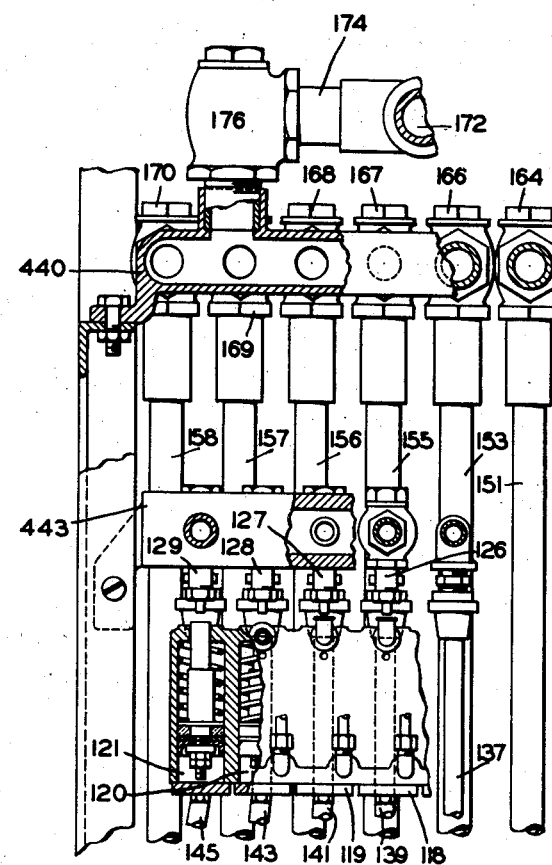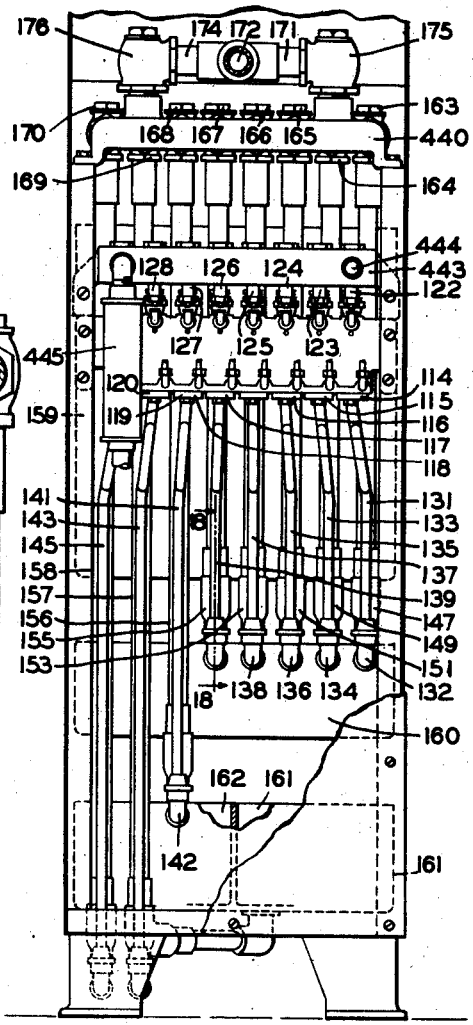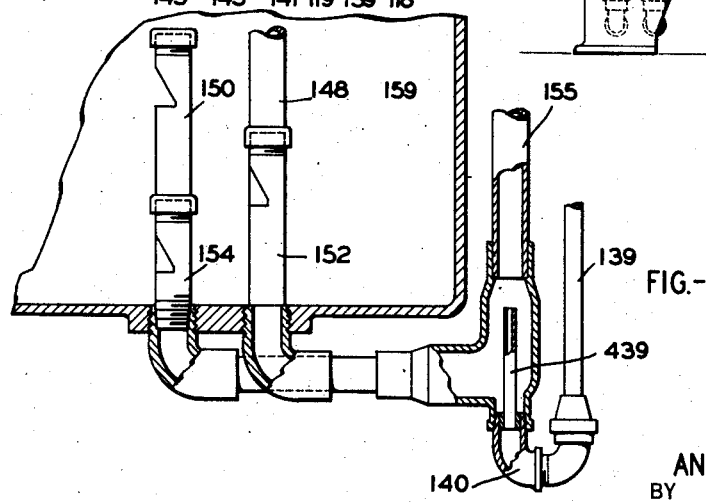

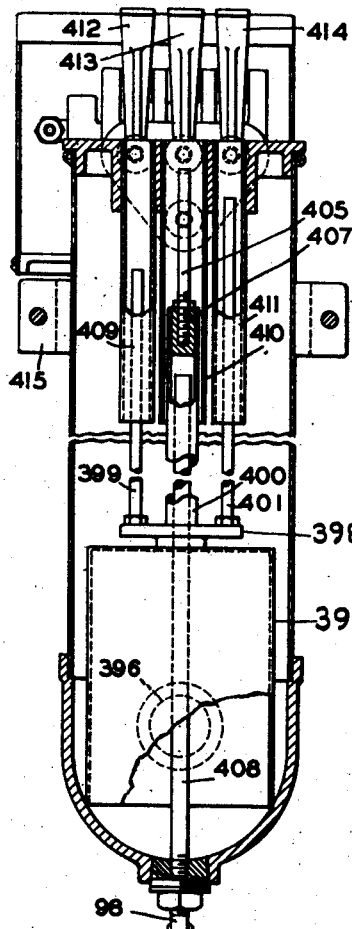
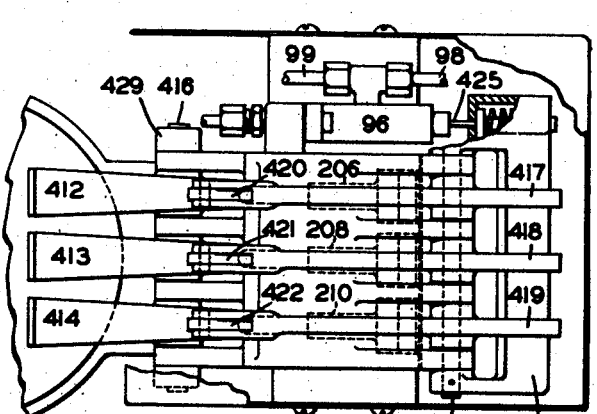
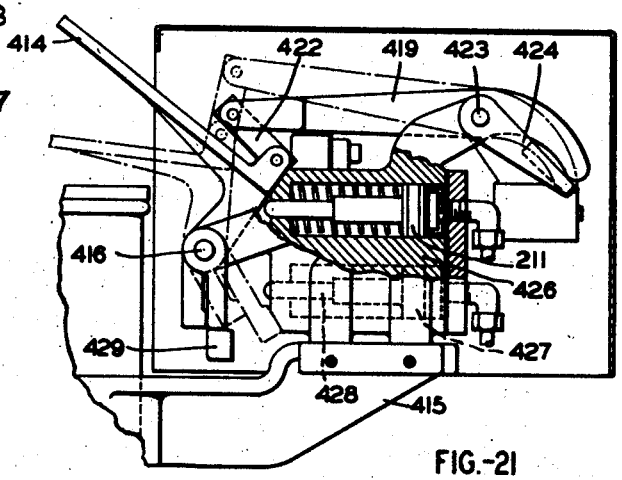
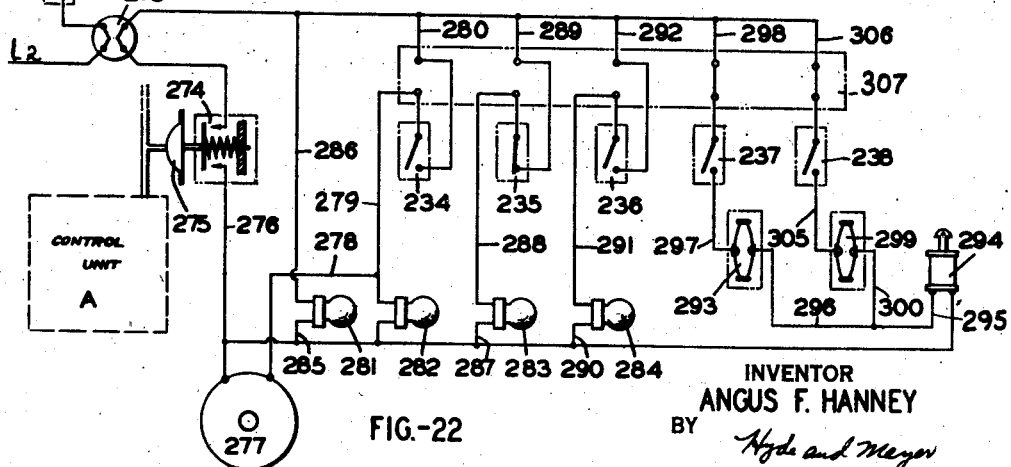

Aug. 31, 1943.  A. F. HANNEY  2,328,073
WASHING MACHINE FORMULA CONTROL
Filed Aug. 2, 1940  17 Sheets-Sheet 12

INVENTOR
ANGUS F. HANNEY
BY
Hyde and Meyer
ATTORNEYS

INVENTOR
ANGUS F. HANNEY
BY Hyde and Meyer
ATTORNEYS

Aug. 31, 1943.  A. F. HANNEY  2,328,073
WASHING MACHINE FORMULA CONTROL
Filed Aug. 2, 1940   17 Sheets-Sheet 14

INVENTOR
ANGUS F. HANNEY
BY Hyde and Meyer
ATTORNEYS

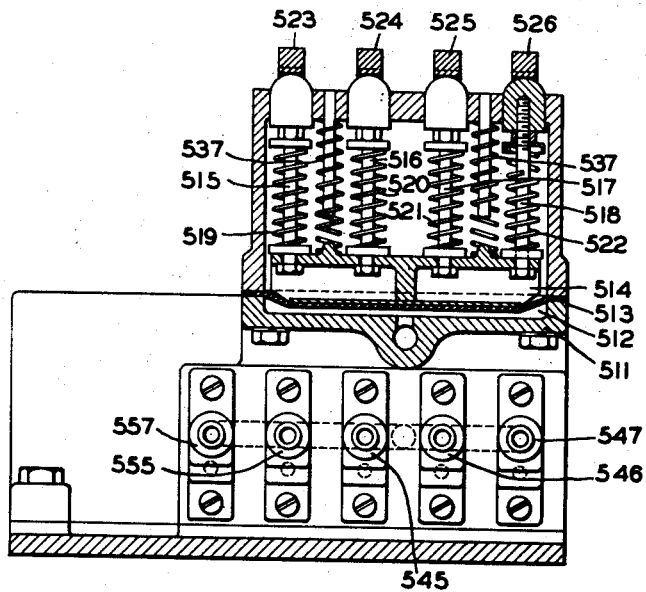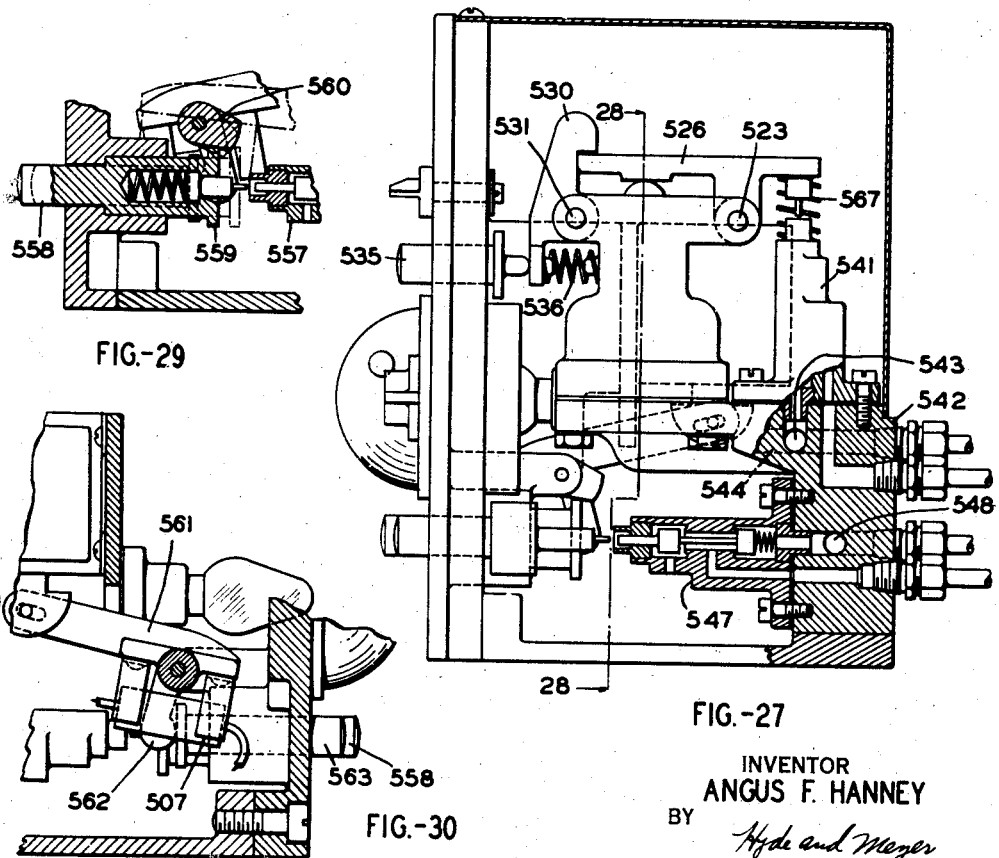

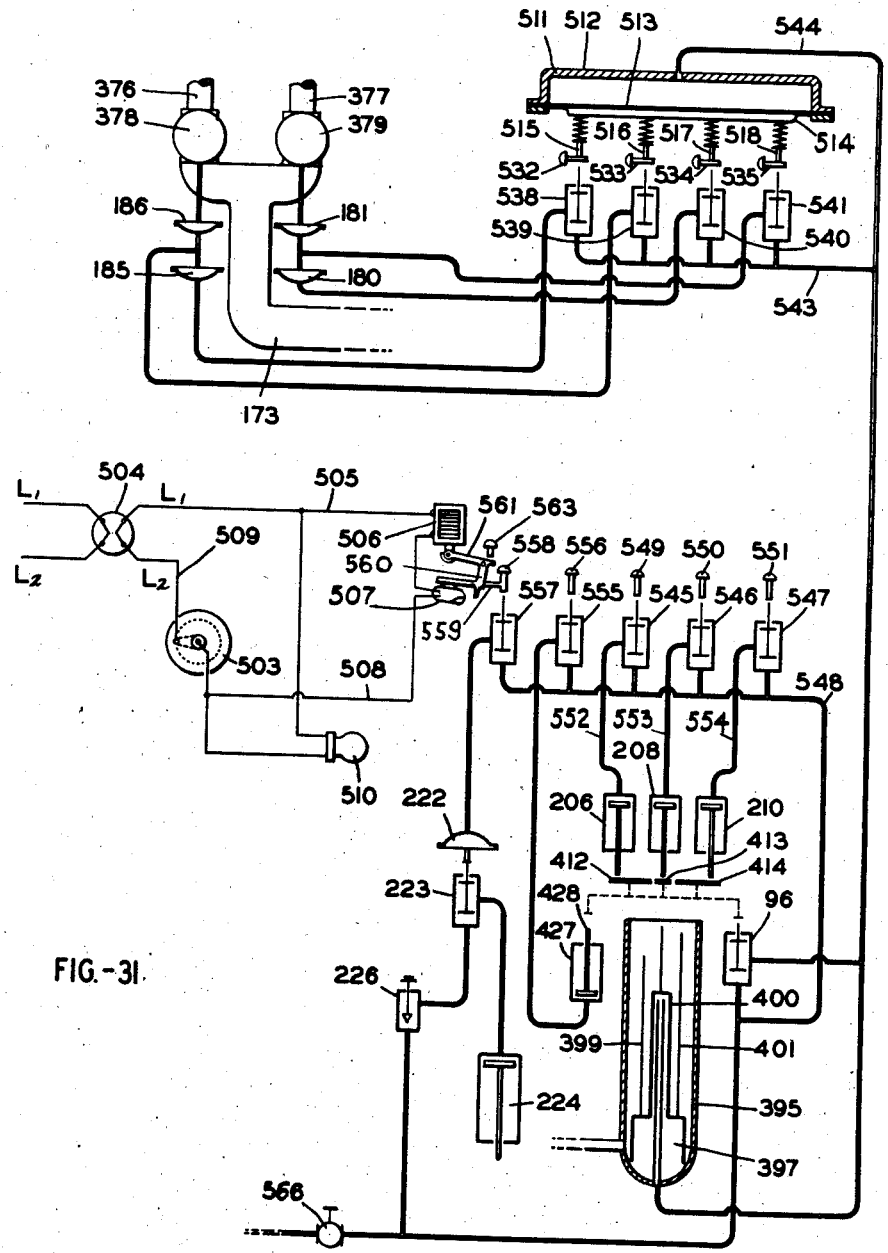

Patented Aug. 31, 1943

2,328,073

UNITED STATES PATENT OFFICE 2,328,073

WASHING MACHINE FORMULA CONTROL

Angus F. Hanney, Norwood, Ohio, assignor to The American Laundry Machinery Company, Norwood, Ohio, a corporation of Ohio Application August 2, 1940, Serial No. 349,880

3 Claims. (Cl. 68—12)

This invention relates to improvements in laundry machinery. Certain features of the invention are particularly applicable to the automatic control of the various operations of the washing formula as practiced with power driven washing machines.

Although the invention is hereinafter described in connection with apparatus for effecting said formula control it will be apparent that, with certain slight modifications such as would instantly occur to those skilled in the art, it could be applied to other classes of laundry machinery, for instance to power driven drying apparatus. It may be further noted here that since the particular structural features of the invention reside, basically, in the controller mechanism and operation, the washing machine which, in its operation, responds to said control is illustrated and described only to an extent sufficient to comprehend the invention as claimed. Any washing machine capable of being started, stopped, and designed to continuously or intermittently agitate a charge of material in a liquid bath may have the sequence, inception, and duration of its operations determined by means of my invention as described herein.

Apparatus for automatically controlling certain operations of the washing formula have heretofore been disclosed and used. The present invention, herein disclosed and claimed, represents a formula control presenting certain novel and useful structural features for automatically controlling, optionally, some or all of the operations of the desired formula.

One object of the invention is to provide an automatic formula control mechanism including means whereby said mechanism may be automatically deenergized and the controller stopped at certain preselected periods during continuous operation of the washing machine, to permit periodic inspection of the load.

A further object is to provide means whereby varying but predetermined amounts of washing supplies may be automatically injected into a washing machine at preselected periods in a washing cycle, the formula controller being temporarily deenergized during the period when said supplies are being injected.

A further object is to provide automatic means whereby the level of liquid in the washing machine may be controlled to various but predetermined levels at preselected periods in a washing cycle, the means for permitting entry of liquid to the washing machine being deenergized so as to be inoperable until the level selector is set, and said water entry means being again deenergized through the instrumentality of said level control means as soon as the liquid reaches the desired level.

A further object is to provide automatic means whereby the liquid in the washing machine may be heated to any desired operating temperature at any predetermined period in the washing cycle, the formula control means being deenergized during the period when the liquid is coming up to temperature, but said formula control means being again energized as soon as the desired temperature is reached.

A further object of the invention is to provide automatic means of the nature just described, for a formula control for any ordinary washing machine of the type hereinabove mentioned of such a nature that any predetermined formula may be put into operation by even an inexperienced operator, merely by a rapid substitution of an element in the control mechanism.

A further object of the invention is to provide means whereby certain related operations in the washing formula may be automatically performed, while certain other operations may be under the manual control of the operator.

A further object of the invention is to provide means whereby certain operations of the washing cycle proceed to a conclusion under automatic control after the specific series of operations are manually set in operation.

Further objects and advantages are in part obvious and in part will appear more in detail hereinafter.

The apparatus for, and the operation of, my control system will first be described in connection with the execution of a formula for a commercial washing machine. This involves the control of the following essential operations.

1. The admission of hot and/or cold water to the tub at suitable times

2. The choice of a suitable liquid level in the tub, which level may be changed at will during the washing cycle 3. The injection, at suitable times, of washing supplies such as soap, soda, bleach, sour, bluing, etc.

4. The control of the temperature of the washing fluid at different values during preselected periods in the washing cycle.

5. Discharge of the washing fluid at suitable times, either to make way for a new charge, or at the finish of the washing operation.

These operations, as will hereinafter appear, may be carried on and controlled during continuous operation of the washing machine. The said washing machine may be of any standard type. It may comprise an outer liquid retaining housing or curb within which a perforated container is agitated or rotated. It may be the newer tubless type washing machine comprising an imperforate rotatable container into which liquid and washing supplies are introduced, for instance through axial trunnions.

Power means of conventional type, usually an electric motor, is generally provided for starting, running, reversing, etc., and braking means are usually combined with the power means. Without going into unnecessary detail, since the specific type and construction of the washing machine forms no part of the present invention, it will be sufficient to state that my invention is readily adaptable to any washing machine which is operated in universally recognized manner, and that such machines and their operative means are included in the scope of the appended claims.

In conjunction with my novel apparatus now to be described I use, as one element, a jacquard control member. In the preferred embodiment shown herein this consists of a member, carrying suitable perforations, which is intermittently advanced by suitable motive means, through a control zone wherein a series of plungers are periodically energized, and at each such energization period one or more of the plungers may register with a corresponding perforation in the jacquard element and, passing therethrough, set in operation further suitable motive means controlling various operations of the washing machine. I prefer to use a perforated, rotating disk which is periodically rotated through a fractional increment of a complete revolution but to those skilled in the art it is obvious that the jacquard system of control may be applied through the instrumentality of a revolving drum, or an endless caterpillar belt, or indeed in other ways. The jacquard control itself is heretofore known and is not claimed herein save as one element of my novel control apparatus.

Further, I have provided means for suspending the operation of my controller from time to time for various purposes. Heretofore such automatic controls as were available operated continuously to the completion of the washing operation unless manually stopped at certain times. I have provided means for stopping the controller at one or more preselected intermediate periods in the washing cycle, determined by the advance of a control disk perforation into registry with a suitable plunger, and which means summon an operator by visible and/or audible signal to inspect the condition of the charge.

I have provided further means which automatically suspend the operation of the controller while water or water and supplies are being admitted to the washer. Briefly, since later more fully described, the energization of suitable means to open one or more water inlet valves sets in operation a dependent motive means which cuts off the power to the controller motor while the water valves remain open, and which means again starts the controller motor when sufficient water has been admitted to the tub.

I have provided further means for automatically suspending the operation of the controller while the washing fluid is being brought up to a predetermined temperature, and for starting the controller when said temperature is reached. Again briefly, this means comprises a mechanical linkage operated by a registering plunger, as above noted, which simultaneously energizes the heating means, and cuts off the current to the controller motor. When the washing fluid reaches the proper preselected temperature a thermostatic switch closes the motor circuit and starts the controller, and the heating means is thereupon cut off.

I have provided further means, operated by plungers when registered with suitable apertures in the jacquard element, for presetting any one of a plurality of members which determine a desired liquid level in the washing machine. As will later be described, this operation is a necessary condition precedent to the operation of the water admission means since the operative means for the water valves is not energized until the level setting operation is performed. It is consequently impossible to admit water to the washer without first setting the water level device.

I have provided further means, operated by suitable float apparatus, as will be more fully described hereinafter, for deenergizing said water valves, and returning said level presetting member to an inoperative position as soon as the proper liquid level is reached.

I have provided further means, operated by a plunger when registered with a suitable aperture in the jacquard element, for opening a dump valve and discharging all liquid in the washer at predetermined intervals in the washing cycle. Thereafter water is again admitted as hereinafter mentioned.

All the above described operations may obviously be repeated or varied at will as predetermined by the entry of certain perforated portions of the jacquard element into the control zone, as I have termed the position where available perforations register with plungers. The plungers in my preferred embodiment are arranged in juxtaposition in a fixed plane, and move as a unit vertically downward thereon at periodic intervals. The construction is such that the plungers which do not register with a perforation remain, for the time being, inoperative.

Finally, when the jacquard element advances to a position such that a suitable plunger registers with the proper perforation, means are provided for disconnecting the controller drive mechanism from the jacquard element, stopping the controller motor, and by audible and/or visible signals informing the operator that the washing operation is completed. This does not necessarily stop the operation of the washing machine, although if desired means may be provided for simultaneously cutting the power of the operative means for the machine.

In the completely automatic form of my formula controller all the above described operations are automatically instituted, after the controller is manually started, and, with the single exception of a further manual start after the intermediate inspection stop or stops, the whole cycle or succession of cycles proceeds automatically to completion, at which point the control is terminated, as described.

It is obvious, however, that certain advantageous features of my invention may be adopted without taking advantage of the complete automatic operation. I shall describe, for instance, as an alternative, apparatus whereby certain of the above described operations of the complete formula may be automatically controlled in accordance with my invention while other operations may be performed manually, or in manner heretofore known. I shall further describe apparatus whereby certain of the operations may be instituted manually but will thereafter proceed to completion under automatic control, the apparatus being somewhat modified from that already mentioned. Obvious alternatives and modifications such as would naturally occur to those skilled in the art are, of course, comprehended within the scope of my claims.

The drawings

Fig. 5 is an elevation of the diaphragm and air valve assembly looking in the direction of the arrows designated 5—5 of Fig. 4, parts thereof being broken away and other parts being shown in section. The formula disc is shown in place in this view.

Fig. 6 is a sectional view taken on the line 6—6 of Fig. 5.

Fig. 7 is a sectional view taken on the line 7—7 of Fig. 6.

Fig. 8 is a sectional view taken on the line 8—8 of Fig. 4.

Fig. 16 is a rear elevation of units A and D, looking in the direction of line 16—16 of Fig. 2.

Fig. 17 is an enlarged fragmental sectional detail of apparatus shown in Fig. 16.

Fig. 18 is a sectional detail taken on the line 18—18 of Fig. 16.

Fig. 19 is a sectional view of the water level apparatus unit C, looking at the front of the machine.

Fig. 20 is a fragmental plan view of the apparatus shown in Fig. 19.

Fig. 21 is an elevation of the apparatus shown in Fig. 20, parts being broken away and other parts shown in section.

Fig. 22a is a pictorial representation in perspective, of the mercury switch assembly and associated operating mechanism.

Fig. 27 is an elevation looking at the right side of Fig. 25, the side cover being removed to expose the mechanism, and other parts of the mechanism being shown in section.

Fig. 28 is a sectional view taken on the line 28—28 of Fig. 27.

Fig. 29 is a sectional view taken on the line 29—29 of Fig. 26.

Fig. 30 is a sectional view taken on the line 30—30 of Fig. 26.

Fig. 31 is a diagrammatic view of the electrical and fluid circuits for the modified form of control.

Figure 1:
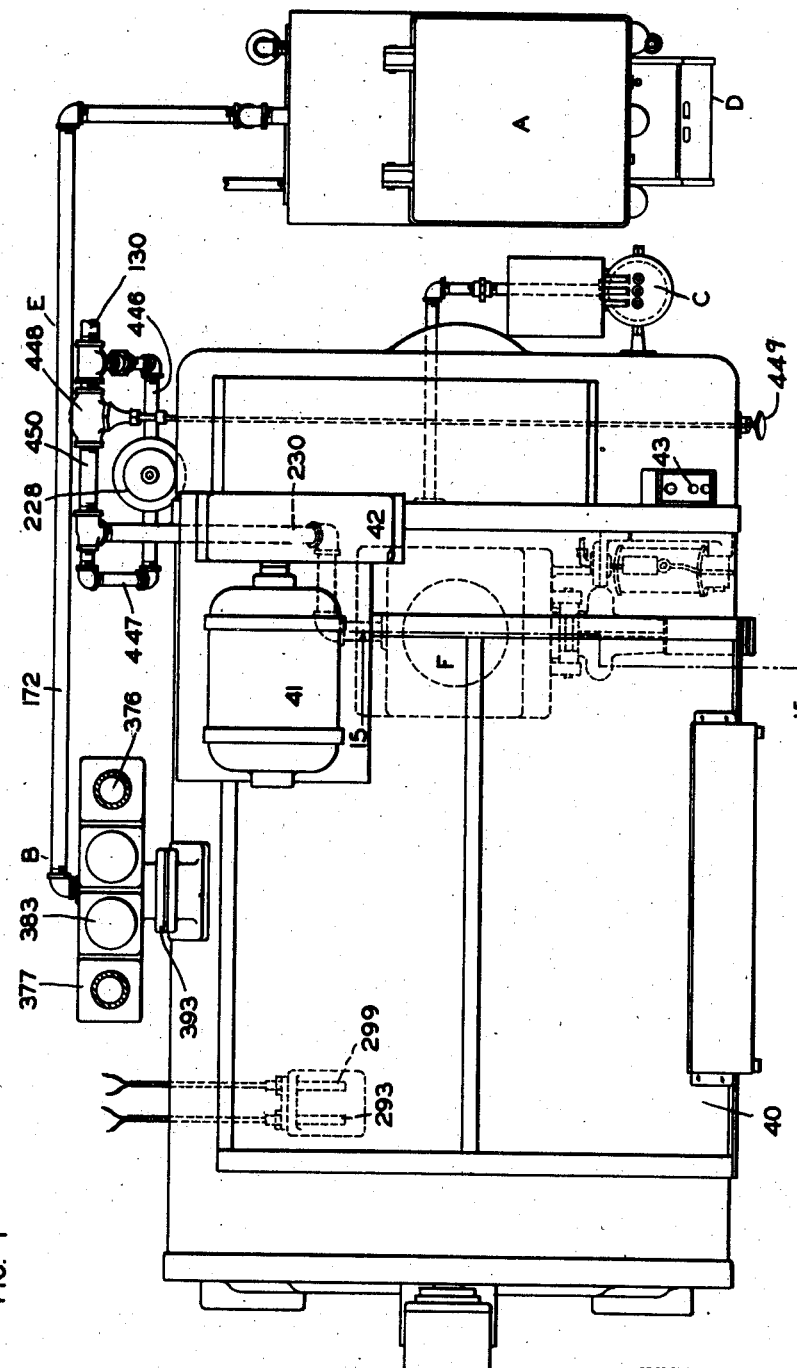
Fig. 1 is a plan view of a washing machine showing the several units making up the formula control and operating mechanism.
Figure 2:
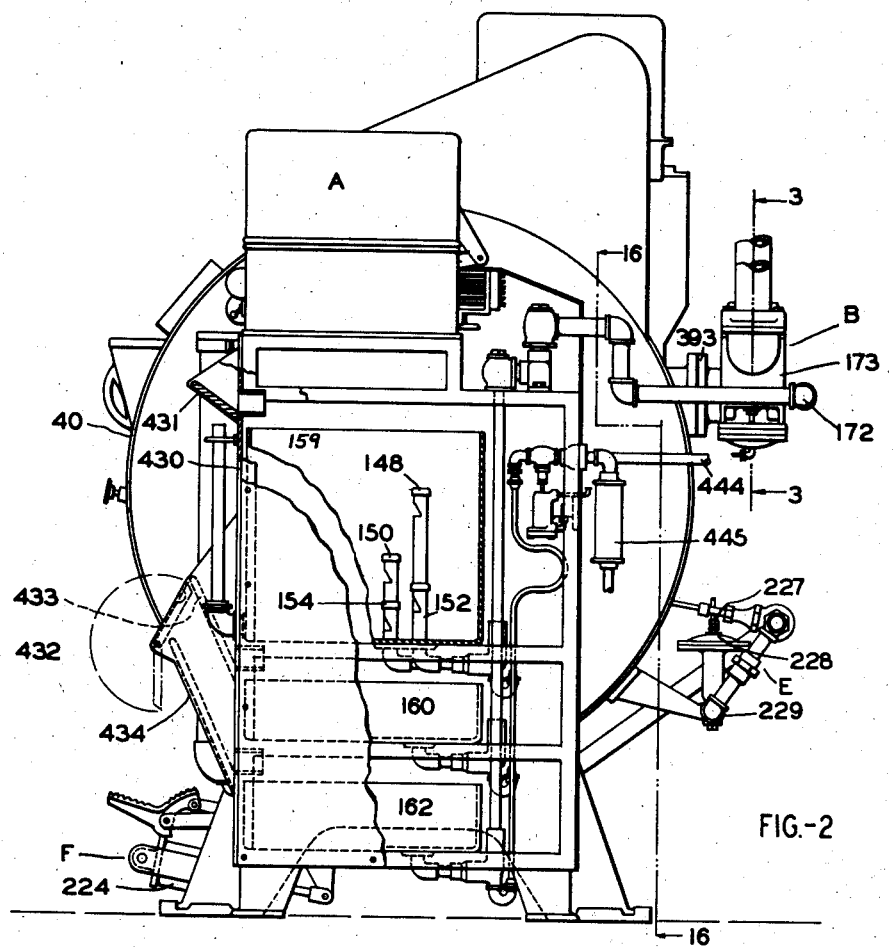
Fig. 2 is an elevation looking at the right end of Fig. 1.
Figure 3:
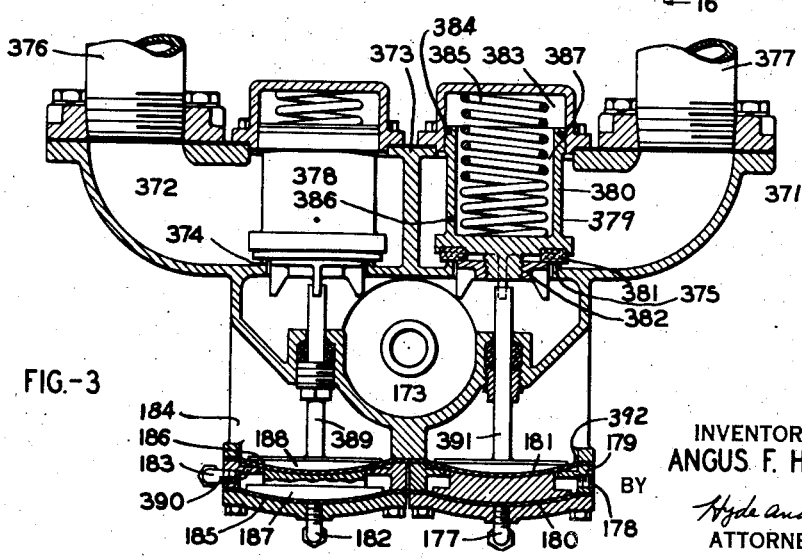
Fig. 3 is a detail sectional view taken on the line 3—3 of Fig. 2.
Figure 4B:
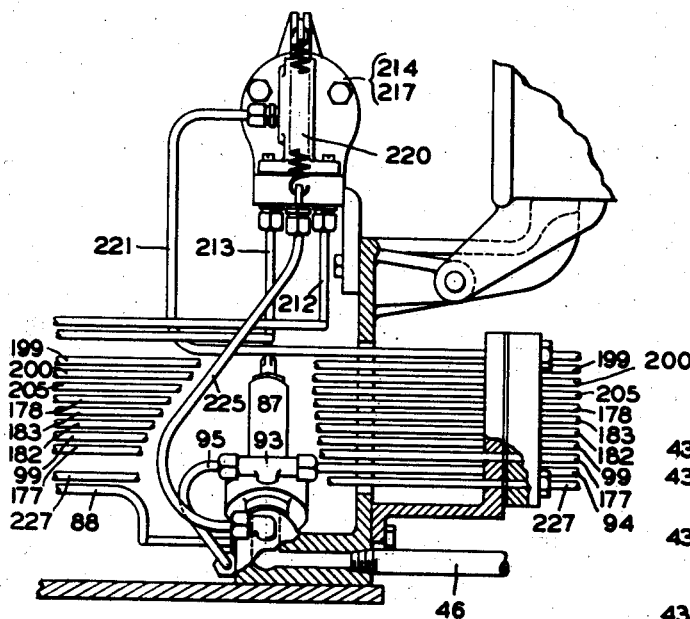
Fig. 4b is a sectional view taken on the line 4b—4b of Fig. 4.

Figs. 1 and 2 show the general location of the various units comprising the operating mechanism for the washing formula, which mechanism is responsive to my formula controller. They are shown in association with a washing machine of conventional design provided with a standard drive including a motor 41 and brake 42 connected in the usual control circuits manipulated by push button switches 43 for running, inching, and stopping. In Figs. 1 and 2 A designates the formula control unit; B is the valve mechanism which controls the supply of hot and/or cold water; C is the water level control mechanism; D is the apparatus which serves to inject supplies; E designates the temperature control mechanism, and F indicates the dump valve and operating mechanism for discharging the liquid from the machine.

These various units will now be more fully described both individually, and insofar as they affect, or are affected by, each other.

The formula control unit

The inception of the various operations of the formula control is actuated through the use of a jacquard control element. In the present embodiment I prefer to use a circular perforated disc which is rotated by increments at equal chronological intervals into a succession of registering positions, so termed by reason of the fact that as the disc pauses in each successive position a plurality of plungers are actuated by an air diaphragm and certain plungers, if permitted by a registering aperture in the disc, actuate air valves or mechanical linkages immediately beneath said disc so as to institute further activity in the various units above identified under the letters A to F. The formula controller unit, hereinafter termed the controller, has the capacity, through the instrumentality of mechanical linkage operated by some of the said plungers, to suspend its own periodic advance and indicate to an operator by suitable signals that it is time, to inspect the condition of the load in the washer. It is obvious that a large number of various operations may be arranged in a desired sequence by suitably designing a disc beforehand with apertures arranged to match with predetermined plungers at preselected times. The disc could be arranged to be advanced, for instance, one ninetieth of its circumference once each minute so that an uninterrupted sequence would take ninety minutes. As will appear, there are certain interruptions, during which time the controller is stopped for more than one minute, so that the total elapsed time of ninety indexing steps is more than ninety minutes. It is apparent that this time may be varied by indexing for more or less than ninety positions or by varying the speed of the controller motor as will appear.

Figure 4C:
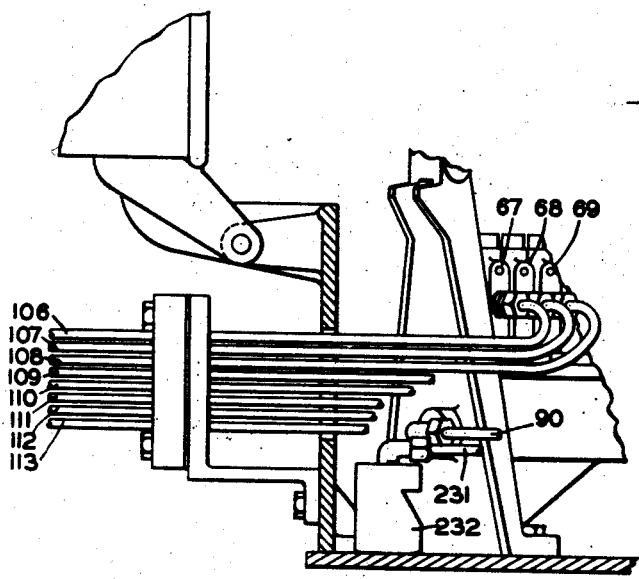
Fig. 4c is a sectional view taken on the line 4c—4c of Fig. 4.
Figure 4D:
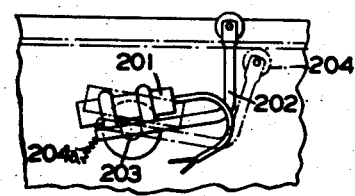
Fig. 4d is an elevation of a safety switch device to guard against inadvertent failure to insert the formula disc.
Figure 4:
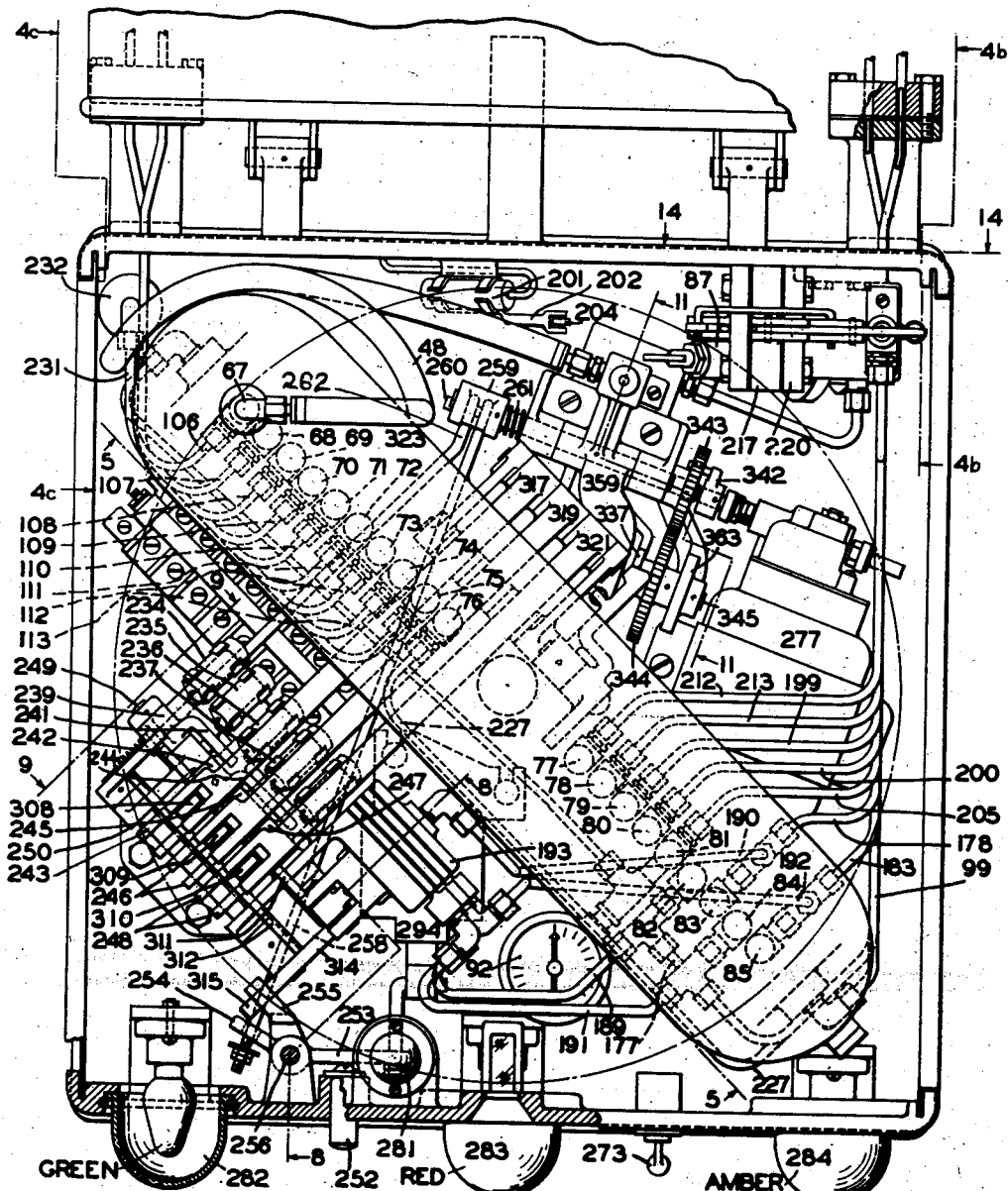
Fig. 4 is a plan view of the controller marked Unit A in Fig. 1, showing this apparatus with the cover removed and with the position of the formula disc indicated by dash-dot lines.

Referring to Figs. 4 to 7 and 23, the controller comprises a diaphragm operator 44 including a chamber 45 which is supplied with a pressure fluid (air) from a supply 46 by a conduit 48. A diaphragm 49 forms the lower face of the chamber 45. This diaphragm is arranged to actuate a plunger block 50 which supports a series of plungers 52. The block (see Figs. 5 and 6) is provided with lateral branches 51 provided with downwardly extending bosses which extend into the upper end of springs 58. These springs engage at their lower end with a portion 60 of the main casting 59. The springs 58 are normally compressed and hold the block upwardly against bars 61 which are fixed to the main casting 59 and in this position hold the diaphragm upwardly, as illustrated in Figs. 4 and 5, when the air pressure is off. Each plunger comprises a rod 53 into the upper end of which is threaded another rod 54. This rod extends upwardly through a hole in the block 50 and is provided with a nut 55. A coil spring 56 surrounding the rod 54 is interposed between the rod 53 and the block 50 exerting a force to normally hold the rod 53 downwardly away from the block 50 but to provide movement relative to the block 50 when the plunger meets with an obstacle, as will be later described. The rod 53 has secured in its lower end a pin 57. This pin extends downwardly through a small bore in a plate 62 and is guided thereby. This plate is secured to te casting 59.

The casting 59 which supports the above described assembly is hinged to a supporting structure 63 at 64. It may be rotated upwardly about this hinged point 64 to insert or remove a formula disc 65. A spring biased latch 66 is provided to hold this assembly in the operating position, as shown in Fig. 5.

Each of the plungers 52 numbered, respectively, 1 to 21, performs a definite function when air pressure is applied to the diaphragm and when the respective plunger pin is registered with a hole in the formula disc. When the plunger 50 is lowered by the diaphragm, but registers with no aperture, the plunger pin engages the disc without effecting an operation and the further motion of the block results in the plunger backing up through the hole in block 50 against the resilient opposition of the spring 56. These springs are strong enough to perform the operations required from the plungers (actuation of air valves) when they pass through a hole in the formula disc but they permit the relief described above when they engage the blank face of the disc. Each plunger pin, however, performs a definite function when it registers with a perforation in the formula disc.

Plungers 1 to 9 (see Fig. 23) operate combination air valves 67 to 75, respectively. In addition to the operation of valve 75, the plunger 9 effects an intermediate stop in connection with the electrical circuits, to be later described. The plungers 10 and 11 jointly operate an air valve 76 to raise the liquid temperature together with effecting a temporary stoppage of the controller in connection with the electrical circuits to be later described. No. 12 operates mechanism to stop the controller at the end of a washing cycle and produce an audible and visible signal. The plungers 13 to 21 operate combination air valves 77 to 85, respectively.

The operations in the process effected by these plungers actuating the respective devices are as follows:

Nos. 1 to 5 control the injection of predetermined but various quantities of soap.

Nos. 6 to 8 control the injection of suitable supplies.

No. 9 effects an intermediate shut-down of the controller.

Nos. 10 and 11 control the admission of steam to the washing fluid for several predetermined temperatures.

No. 12 stops the controller mechanism at the end of a washing cycle.

No. 13 controls opening of the discharge valve.

No. 14 controls closing of the discharge valve.

Nos. 15, 16 and 17 control predetermined levels of water in the tub.

No. 18 controls the cold water valve for half-open condition.

No. 19 controls the cold water valve for full-open condition.

No. 20 controls the hot water valve for half-open condition.

No. 21 controls the hot water valve for full-open condition.

These air valves and other apparatus just described, are carried by the supporting structure 63, as shown in Figs. 5, 6 and 7.

*The fluid pressure circuits*

A general discussion of the fluid pressure circuits is presented herewith, although later dealt with in piecemeal fashion in discussing their operation in connection with each of the units A to F. The discussion should be read in connection with Fig. 23 although Figs. 4, 4a, 4b, 5 and 14 supply certain structural details.

The main air supply shown at 46 is connected under control of a manual valve 47 into a pressure regulator 87. From the pressure regulator conduits 88 and 89 supply pressure fluid to the valves 77 to 81, inclusive. A branch 90 of this conduit line supplies pressure fluid to valves 67 to 76, inclusive. A second branch 91 is connected to a pressure gauge 92.

Another conduit 93 leads from another connection on the pressure regulator which branches into conduits 94 and 95. 94 is connected to a combination valve 96 which controls the flow of pressure fluid to branch conduits 98 and 99. Conduit 98 connects with the bottom of the float chamber of the water level apparatus, designated unit C in Fig. 1. Conduit 99 supplies pressure fluid to the valves 82 to 85, inclusive. Branch 95 is connected to a combination valve 100 which controls the supply of pressure fluid through the conduit 48 to the diaphragm chamber 45.

The delivery connections of the valves 67 to 74 are connected, respectively, by conduits 106 to 113 to servomotors 114 to 121, respectively.

These servomotors, when energized, operate steam valves 122 to 129, respectively, which control delivery of steam from the steam supply line 130 to injector pipes 131 to 146, respectively, of the supply injecting unit designated D in Figs. 1 and 2. These injector pipes are connected into pipes 147 to 158, respectively. 147 to 155 are in the form of stand pipes which extend upwardly at different levels in the soap container 159 of the unit D and control the amount of soap delivered in accordance with the level of the upper end of the respective stand pipe. 156 supplies the bleach from the bleach container 160. 157 supplies sour from the sour container 161, and 158 supplies blue from the blue container 162.

Each of these pipes is provided with a check valve 163 to 170, respectively; the pipes 147 to 156 which supply the alkalies (soap and bleach), are connected into a common conduit 171 which is connected to a main conduit 172 leading to the water supply header 173 of the water supply valve unit, designated B in Figs. 1 and 2. The supply pipe 157 and 158 for acids (sour and blue) converge into a common conduit 174 which is connected with the main supply conduit 172 leading into the water header 173. A check valve is provided in each of the conduits 171 and 174, numbered 175 and 176, respectively. These prevent any possibility of back flow of alkalies or acids into the acid and alkali systems, respectively. These two valves 175 and 176 constitute a double precautionary means.

The delivery connections of the valves 82 and 83 are connected by conduits 177 and 178 for actuation of the diaphragms 180 and 181, respectively, of a double diaphragm servomotor 179 which actuates the water supply valve, designated unit B in Figs. 1 and 2. Actuation of the diaphragm 180 causes the cold water valve to be half opened and actuation of diaphragm 181 causes full opening of that valve, as will be later described in more detail in connection with a full description of unit B.

The delivery connections of the valves 84 and 85 are connected by conduits 182 and 183 for actuation of the diaphragms 185 and 186, respectively, of a double diaphragm motor 184 of the water supply unit B. These control half opening and full opening, respectively, of the hot water valve. The conduits 177, 178, 182 and 183 inclusive, are connected by conduits 189 to 192, inclusive, to diaphragms 194, 195, 196, and 197, respectively, of a multiple diaphragm servomotor 193. Actuation of any one of these diaphragms energizes electrical apparatus to shut down the controller temporarily or for the period required to fill the washer to the predetermined lever. This mechanism will be described later in more detail.

The delivery connections of the valves 79 to 81 are connected by conduits 199, 200 and 205 with servomotors 206, 208 and 210, respectively, forming a part of the water level apparatus designated C in Figs. 1 and 2, to be later more fully described.

Figure 15:
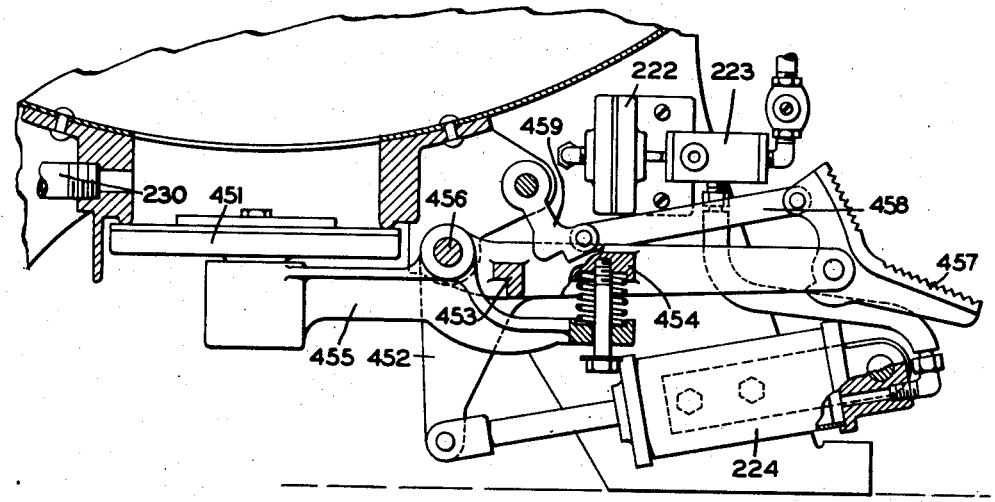
Fig. 15 is a sectional view taken on the line 15—15 of Fig. 1.
Figure 14:
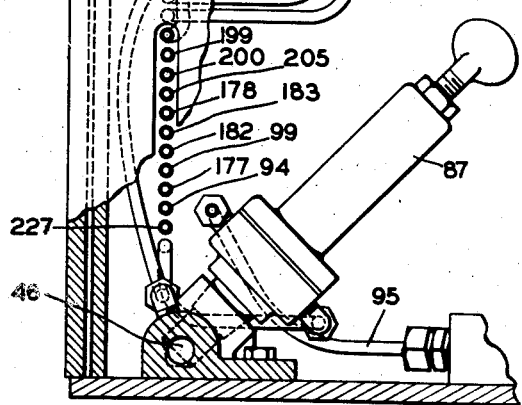
Fig. 14 is a fragmental sectional view taken on the line 14—14 of Fig. 4.

The delivery connections of valves 77 and 78 are connected, respectively, by conduits 212 and 213 to diaphragm motors 214 and 217, Figs. 14 and 15, which are arranged to operate a combination valve 220 which controls supply of pressure fluid through conduit 221 to a diaphragm motor 222 which in turn operates another combination valve 223 controlling the supply of pressure fluid to a servomotor 224 associated with the discharge valve mechanism, designated unit F in Figs. 1 and 2, for the operation thereof. Pressure fluid is supplied directly to the valve 220 from the main supply through a conduit 225. Pressure fluid supply for valve 223 is supplied from the main supply through a needle valve 226.

This discharge valve mechanism may be somewhat simplified by direct connection of the linkage of the double diaphragm 214 to 217 with the valve 223, or the valve 220 could be connected to the fluid motor 224 eliminating servomotor 222 and valve 223. In the embodiment shown herein, which represents an actual commercial assembly, the present arrangement uses 222 and 223 as a relay unit to eliminate any possibility of sluggish exhaust operation through the long fluid lines from the controller to the discharge valve mechanism.

The delivery connection of valve 76 is connected by conduit 227 to a diaphragm motor 228 which operates a valve 229 in the steam supply line for delivery of live steam by conduit 230 to the washer casing. This apparatus is associated with the unit designated E in Figs. 1 and 2 for control of bath temperatures.

The delivery connection of valve 75 is connected by a conduit 231 with a whistle 232, the function of which will be later described.

Both of the valves 75 and 76 are supplied with pressure fluid from the conduit 90.

*The electrical circuits and related apparatus*

Figure 22:
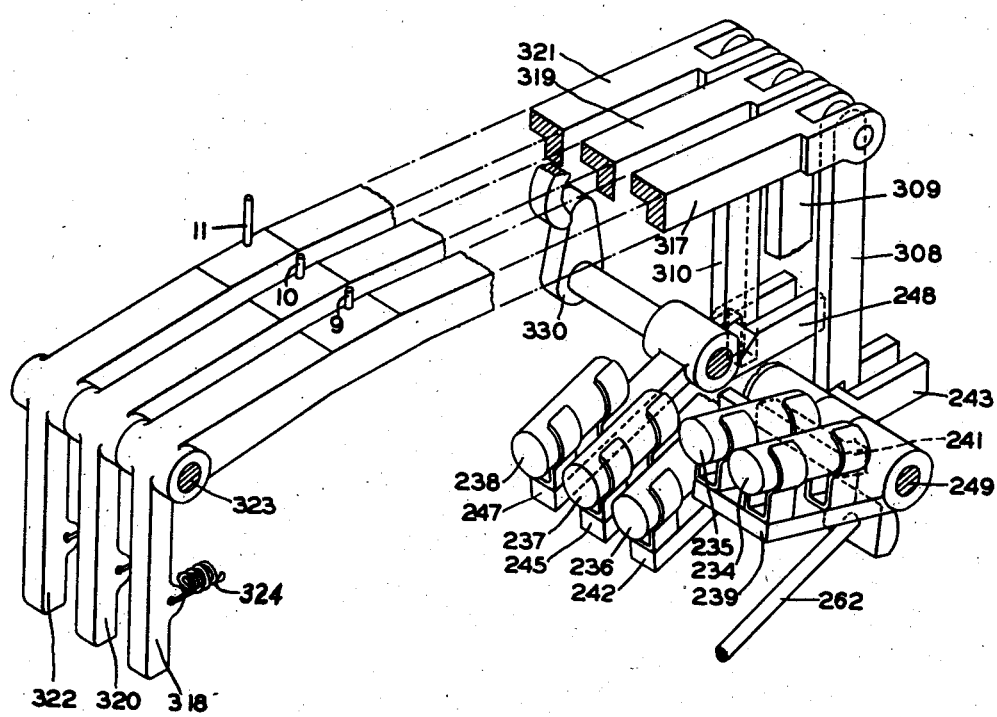
Fig. 22 is a wiring diagram of the electrical circuits.

The electrical circuits for the completely automatic form of my invention are shown diagrammatically in Fig. 22 and certain related mechanical apparatus and switch mountings are illustrated in Fig. 22a in perspective, dissociated from surrounding structure. The actual construction is seen in various aspects in Figs. 4 to 12 inclusive, and to some extent diagrammatically in Fig. 23.

The electrical apparatus for the formula controller embodies five mercury switches 234 to 238, inclusive. Switches 234 and 235 are supported by holding clips on a lever 239. Each of the switches 236 to 238 is supported by holding clips on levers 242, 245 and 247, respectively. These latter four levers are mounted on a shaft 249; 239, 245 and 247 are freely mounted thereon and 242 is fixed to the said shaft. The shaft is supported in bearing brackets 250 and 251. When the controller is shut down or in idle position, the lever 239 lies in a position to elevate the switches 234 and 235 because of rod 262, as shown by the dash-dot lines of Figs. 8 and 9. The other switches are normally in the down position, as shown by the full lines. Under these conditions switch 234 is open, switch 235 is closed and switches 236, 237 and 238 are open.

To set these devices in position to start the controller, a button 252 on the front panel is depressed (see Fig. 4). This engages a lever 253 which is pivotally mounted on a vertical shaft 256. Branch 254 of this lever engages with a collar 257 on a rod 258 pulling the said rod forwardly. The other end of the rod is connected to a lever 259 (see Fig. 11) which lies normally in the dash-dot line position of Fig. 11. This lever is pinned to a shaft 260 which is biased by a spring 261 to the said dash-dot line position. When the rod 258 is pulled, this lever is rotated to the full line position of Fig. 11. It has also connected to it another rod 262 which extends forwardly through a hole in a branch extension 240 of the switch lever 239 (see Figs. 9 and 10). This rod is provided with a locking nut 272 which engages back of the extension and, when the lever 259 is in the dash-dot position, holds the switch lever 239 in the previously referred to up-position. When this rod 262 moves forward, it permits the switch lever 239 to drop to the full line position of Fig. 9. Switches 234 and 235 now lie in the downward position and 234 is now closed and 235 is open, and 236 to 238 remain open, as previously described. To start the controller, this snap switch 273 is closed, energizing the circuit as will be described (see Fig. 22).

Figure 23:
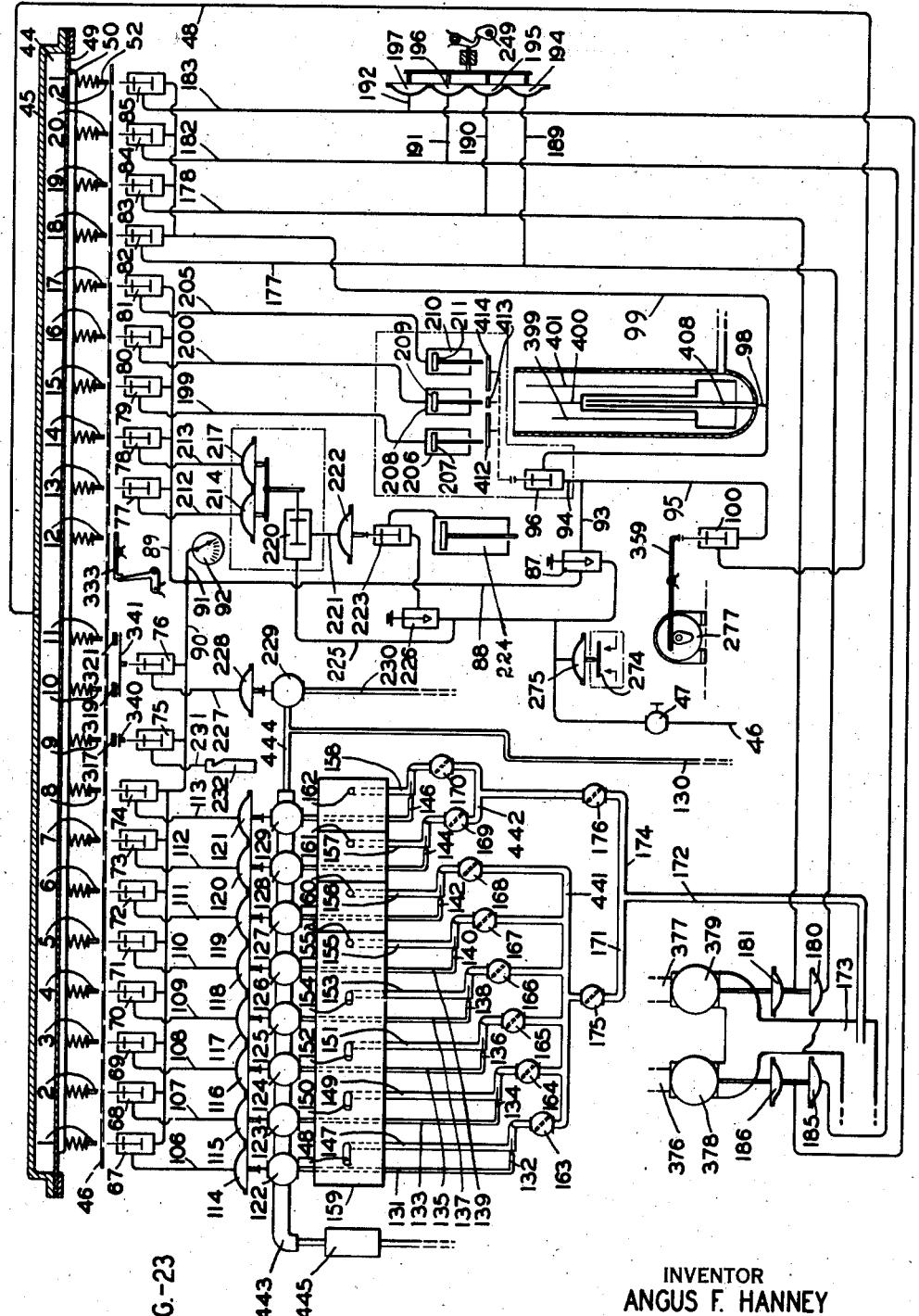
Fig. 23 is a diagrammatic view of the fluid circuits for the apparatus.

Just beyond this snap switch in the circuit, there is another switch 274 (Figs. 22 and 23). This is operated by a diaphragm motor 275 which is connected into the main air line of the pressure fluid circuits. This switch is normally open and is not closed until the pressure fluid is supplied to the said air circuits and the controller cannot be operated until the pressure fluid lines are open.

Referring to Fig. 22, L—1 is connected through a normally closed mercury switch later to be described, and thence through the switches 273 and 274 by a conductor 276 with a motor 277. The other terminal of the motor is connected by conductors 278, 279, switch 234, conductor 280 to L—2. Motor 277 is a geared head motor and constitutes the power means for the controller drive.

Several lamps 281 to 284 are provided. 281 furnishes a white light which illuminates a dial which indicates the period of any cycle during the operation. 282 is a green signal light. 283 is a red signal light, and 284 is an amber signal light. As shown in Fig. 22, the white lamp 281 is connected across the electrical supply lines by conductors 285 and 286. The green lamp is connected across the lines through switch 234. The red lamp is connected across the lines through switch 235 by way of conductors 287, 288 and 289. The amber lamp is connected across the lines through switch 236 by way of conductors 290, 291 and 292.

Switch 237 is in circuit with a thermostatic switch later described in connection with the temperature control, 293 and with a solenoid 294. This circuit is across the electrical supply lines by way of conductors 295, 296, 297 and 298. Switch 238 is in circuit with another thermostatic switch 299 which is also in circuit with the solenoid 294. This circuit is across the lines by way of conductors 295, 300, 305 and 306. 307 designates a connection terminal panel. The two switches 293 and 299 extend into the tub, as shown in Fig. 1, and operate in connection with temperature control apparatus to be later described in detail. They are a conventional type of thermostatic switch, of which there are two types—the "break" and the "make" type. In this control we use the "make" type, namely, the circuit is closed when the temperature rises to the proper point.

Figure 9:
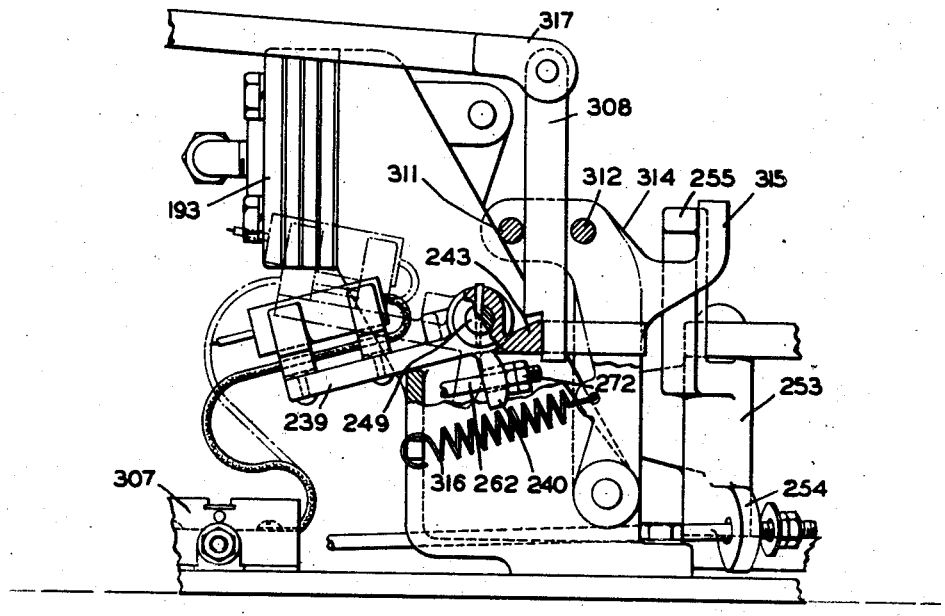
Fig. 9 is a sectional view taken on the line 9—9 of Fig. 4.
Figure 10:
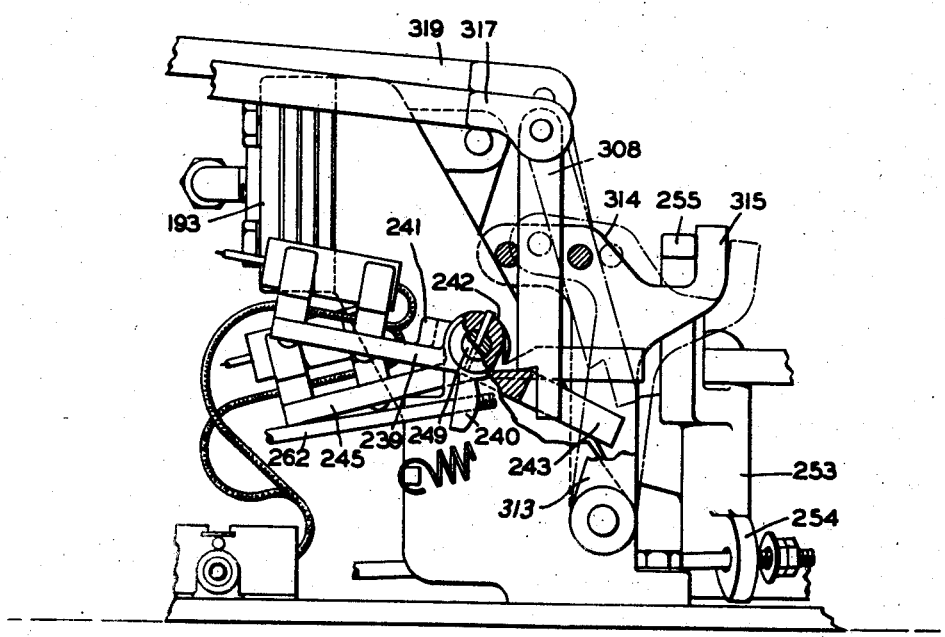
Fig. 10 is a view like Fig. 9 showing the parts in operated position.

As previously described, the switch lever 239 is provided with a downwardly extending branch 240 which is connected with the rod 262. Each of the other switch levers 242, 245 and 247 have longitudinally extending branches 243, 246 and 248, respectively. As shown in Figs. 4, 9, 10 and 22a, these branches are forked and between the prongs of each extend fingers 308, 309 and 310. The lower ends of these fingers are notched out as shown in Figs. 9, 10 and 22a, forming a slightly inclined shoulder which is adapted to engage the forked shaped branches 243, 246, and 248, respectively, at the crotch thereof and, under certain conditions, to tip the levers 242, 245, and 247, respectively, when the fingers are depressed. It is now understood that there is a finger 308 to 310 for each lever 242, 245 and 247, respectively.

Fig. 9 has been drafted to show the lever 239 and its switch in two positions and should be studied in connection with Fig. 22a. The full line position shows the lever and switch when the control has been set into operation. The dash-dot lines show the lever and switch when the control is idle or shut down. Fig. 10 has been drafted to show these parts in a position that they will be in some period in the operating cycle. In this particular case, the finger 308 has been depressed by plunger 9, etc., causing elevation of the lever 242 and its switch 236, which is back of 239 in this view. The lever 239, as a part of its boss, has a branch 241 (see Figs. 4 and 10) which extends laterally over the lever 242 so that when the said lever 242 was raised by the finger 308, the lever 239 supporting switches 234 and 235 are also raised. In back of this group, in Fig. 10, may be seen the lever 245 and in back of that is the lever 247, both of which are in the down position. At different periods in the cycle, levers 245 and 247 are also raised by their respective fingers 309 and 310. The boss of lever 242 also has a branch 244, see Figs. 4 and 22a, which laterally extends over the levers 245 and 247 so that when either one of these levers is raised by its respective fingers, 242 and 239 are also raised.

Each of the fingers 308 to 310 extend downwardly between a pair of rods 311 and 312. These are supported by brackets 313 and 314, see Fig. 4. Bracket 314 has a branch 315 which engages with a branch 255 of the lever 253. When lever 253 is rotated by the push button or by the solenoid 294, the assembly 313 and 314 and the rods 311 and 312 are rotated clockwise, as shown in Fig. 10, rotating the fingers 308 to 310 counterclockwise out of engagement with the lever branches 243, 246 and 248, permitting the levers and switches to drop. This is a releasing means. The bracket assembly 313—314 is biased to the position of Fig. 9 by spring 316.

Each of the fingers 308 to 310 are pivotally connected at their upper ends to levers 317, 319 and 321, respectively. These extend rearwardly and are pivotally mounted on a shaft 323, see Figs. 4, 11 and 22a. Each lever has a downwardly extending branch 318, 320 and 322, respectively, in the form of a bell crank. Coil springs 324, 325 and 326 are connected, respectively to each of the branches (see Figs. 6, 7, and 22a) to normally hold the levers 317, 319 and 321 in an upward position, as shown by the position of 317 in Fig. 9. This assembly is supported by brackets 327 and 328, see Fig. 7.

Referring back to Figs. 5 and 23, the levers 317, 319 and 321 are operated by plungers 9, 10 and 11 which in turn cause operation of the valves 75 and 76, as previously described.

Going back to the mercury switch assembly, the switch shaft 249 has fixed to its right end (referring to Figs. 4, 8 and 22a) a short lever 330. With the control in operation, the lever lies in the position shown by full lines in Fig. 8. During the operation of filling the tub with water, due to variable conditions which generally exist in water systems, it is desired to temporarily stop the control during this period until the desired level is reached. For that reason the multiple diaphragm motor 193, previously described in connection with the fluid circuits of Fig. 23, is provided.

In operation, assume that any one or a pair of the valves 82 to 85 have been operated by respective plungers, initiating operation of the valve to supply water to the washer. In this case, the respective one or pair of the diaphragms in the diaphragm motor 193 is energized. This depresses the stem 198 of this motor which engages a lever 331 moving it from the full line position in Fig. 8 to the dash-dot line position which, engaging the lever 330, moves it to the dash-dot line position. Rotation of the shaft 249, caused by this movement, effects operation of certain of the switches to shut down the control until the desired level of water is reached, at which time operation is resumed. The sequence of operations that takes place here will later be described under "Operation."

Referring to Figs. 4, 6, 7, 11 and 23, numeral 333 designates a latch. This latch is pivotally mounted on a branch 329 of the bracket 328 (see Fig. 6). When the machine is set into operation by depression of the button 252 (see Fig. 4), the shaft 260 was rotated clockwise (see Fig. 11) and finger 337 of a member 334 pinned to that shaft was rotated clockwise from the dash-dot line position of Fig. 11 to the full line position back of the said latch, as shown. This latch is the means for holding the shaft 260 in the operating position. At the end of a washing operation, the plunger 12 engages this latch, rotating it counterclockwise, as viewed in Figs. 6 and 11, raising it away from the finger 337 which permits the said finger and other mechanism, to be later described, to drop out of operating position.

In addition to this function, one end of this latch lies over and in contact with a short lever 338 (Figs. 5, 6, and 7). This, as shown in Fig. 6, is pinned to a shaft 339. This shaft is supported by the bracket members 327 and 328. It has pinned to it another short lever 340 which lies between the lever 317 and the stem of the valve 75, see Fig. 5. The shaft also supports freely thereon another wide lever 341 which bridges the levers 319 and 321 and lies between them and the stem of valve 76 as shown in Fig. 5. The function of the short lever 340 is to operate the valve 75 when the release latch 333 is depressed at the end of a washing cycle to supply air to the whistle 232 to audibly signal to the operator that the washing cycle has been completed. It is understood, of course, that the plunger 9 also operates the valve 75, and when it does so, its effect upon the short levers 338 and 340 is merely to depress them without producing any operation. The function of the wide lever 341 is to operate the valve 76 when either of the levers 319 and 321 are depressed. The shaft 339, in the case of this lever, is only a supporting means.

The controller drive mechanism

The controller is driven from a geared head motor through intermediate gearing including a cam shaft which periodically advances the jacquard element into the next successive indexing position. Normally, that is to say when the controller and washing machine are idle, the cam shaft mounting permits the shaft to be swung out of engagement with the gear which cooperates in the advance of the jacquard element. It is engaged by pressing a starting button on the front of the controller. This button, through intermediate linkage, performs two operations. It moves the cam shaft into engagement with the disc drive and it simultaneously tilts the mercury switch, above described, which closes the circuit to the controller motor. A complete rotation of the cam shaft advances the formula disc one increment. Assuming that one rotation of the cam shaft takes sixty seconds, the time is distributed approximately as follows. As will be seen immediately hereinafter, fifteen seconds are occupied in the actual advance of the disc. During the next thirty seconds another cam on the same shaft activates the plunger diaphragm and the indexing operation is effected. During the final fifteen seconds the trailing edge of the first cam is clearing and the leading edge coming into position to move the disc to its next position to repeat the cycle. A detailed description follows, which should be read in conjunction with Figs. 4, 5, 11, 12 and 13.

Figure 12:
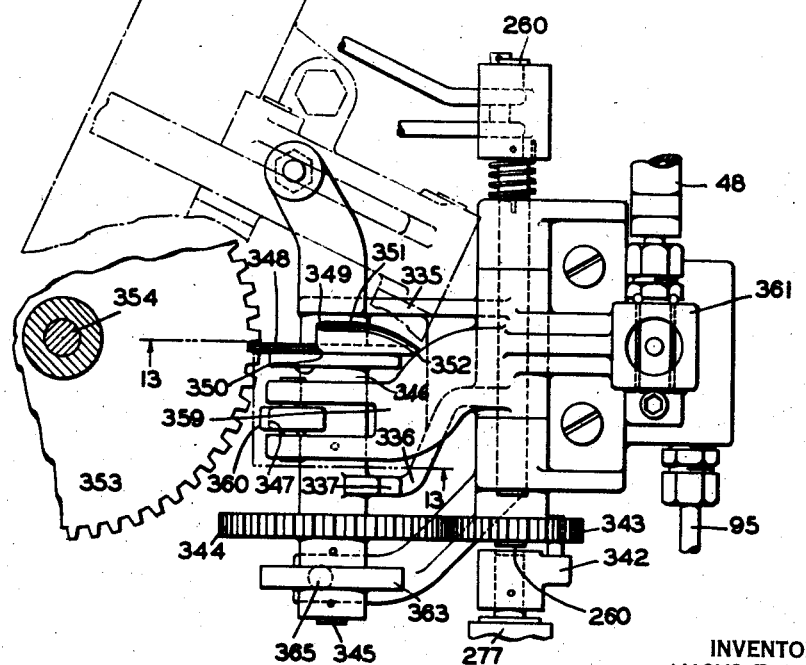
Fig. 12 is a plan view of Fig. 11 with the upper portion removed.

Motor 277 is a fractional horse power geared head type. It is mounted on the supporting base of the controller unit and is connected by a coupling 342 with a pinion 343 mounted freely on the end of shaft 260. This pinion meshes with a gear 344 which is fixed to a shaft 345. This shaft is supported by the branches 335 and 336 of an arm 334, the previously described finger 337 being a part of this assembly. The arm is pinned to the shaft 260. The shaft 345 has fixed to it a cam block 346 which supports two cams 347 and 348. Cam 347 is an integral part of the cam block, and the cam 348 is in the form of a plate which is secured to the side edge of a flange on the block, as shown in Fig. 12. The cam 348 engages with a gear 353 which is pinned to a vertical shaft 354 (see Fig. 5). This shaft is supported for rotation in the supporting structure 63 and it extends upwardly and has secured on it a block 355. The upper end of this block, as shown in Figs. 5 and 6, has a raised portion in the form of a key 356 which is adapted to register with a matched slot in the lower face of the hub of the formula disc 65. The upper end of this shaft is threaded and is adapted to receive a nut 358 which is provided to hold the formula disc in coupled position with respect to the said block and shaft assembly. This constitutes a drive for the formula disc. The shape of the cam 348, as shown in Fig. 12, is such as to give the shaft 354 and the formula disc rotative movement in increments equivalent to the pitch of the gear 353. This increment of movement is performed in substantially one quarter of a revolution of the shaft 345 in the following manner.

Figure 13:
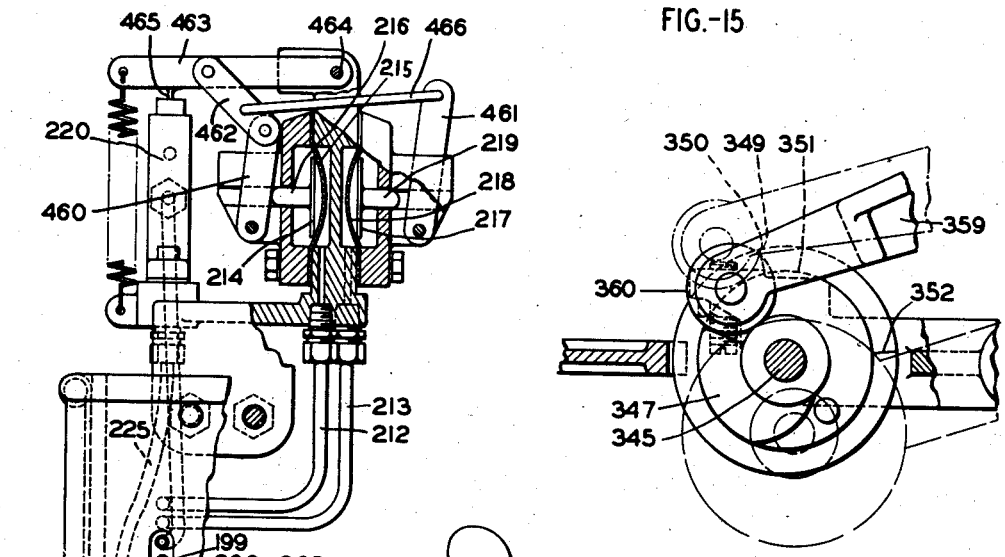
Fig. 13 is a sectional view taken on the line 13—13 of Fig. 12.

The point 349 may be considered the forward end of the cam and 350 the rear end. In rotation, as the forward end engages between the two teeth of the gear 353, the rear end is leaving. The actual working portion of this cam is between the points 351 and 352 (see Figs. 12 and 13), the distance between 349 and 351 representing a short dwell to permit complete disengagement of the rear end 350 before actual movement of the gear begins to take place. During rotation between the points 351 and 352, gear 353 is rotated the distance of one tooth. As shown in Fig. 13, this is actually a little less than one quarter of a revolution. During the remaining part of the revolution, gear 353 and the formula disc are stationary. The formula disc is perforated in accordance with the desired formula so that in each of these increments of movement certain of the perforations may be registered with certain of the plungers to permit operations in the washing process.

As shown in Fig. 13, the cam 347 is positioned on the cam block relative to the cam 348 so that soon after the gear 353 has completed its increment of movement, the cam 347 reaches a position to engage the follower 360 of a lever 359 to rotate this lever clockwise to the dash-dot line position. The lever 359 is freely mounted on the shaft. The rearward branch 361 supports a spring biased plunger 362 which is adapted to engage the stem of the valve mechanism 100 which supplies air to the diaphragm chamber 45 of the controller unit. When a set of perforations in the formula disc have been registered, the valve 100 is actuated to admit air to the plunger diaphragm and operate the plungers to effect operations in accordance with the formula. As will be seen in Fig. 13, the length of the working surface of the cam 347, including the rise, during which the valve 100 is opened, is substantially one-half of a revolution of the shaft 345. If we assume that the shaft 345 rotates at the rate of one revolution per minute, then substantially fifteen seconds is used to register the formula disc. Closely following this, substantially thirty seconds is used to open the valve and actuate the plungers and the balance represents a dwell prior to a repeat of the operation in which the plunger apparatus resumes its normal position.

Figure 11:
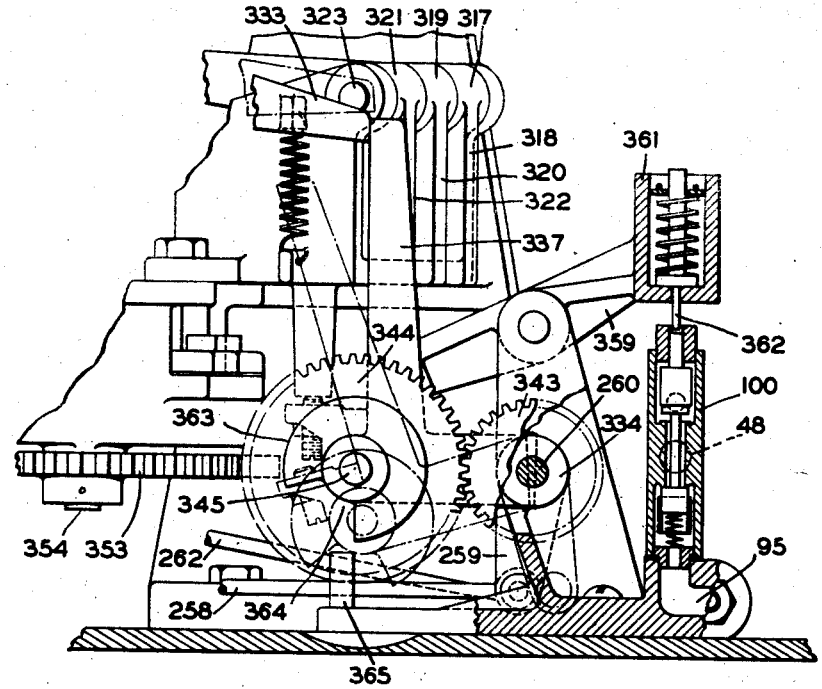
Fig. 11 is a sectional view taken on the line 11—11 of Fig. 4.

It should be understood that with the controller in idle position, the drive mechanism lies in the dash-dot line position of Fig. 11 with the cam 348 completely out of engagement with the gear 353 and it is not in engagement until the push button 252 is depressed to set the various parts of the apparatus in position for operation. This, as previously described, rotates the shaft 260 and raises the drive mechanism to the engaging position with the gear 353 where it is latched by the engagement of the latch 333 with the finger 337.

It was also previously described that at the end of a washing cycle, when the latch 333 was operated by plunger 12, the finger 337 was released. This, of course, permits the drive mechanism to drop out of engagement with the gear 353. In order to assure the proper position of the mechanism for the beginning of the next complete washing cycle, a collar 363 is fixed to the shaft 345. This collar, as shown in Fig. 11, has a notch 364. A vertically extending pin 365 is provided which lies beneath this collar and when the parts are in the fully engaged position, this pin lies just clear of the outer periphery thereof. When the controller is shut down at the end of the washing cycle, should the notch in the collar not be opposite the pin which represents the proper relation of the mechanism for the succeeding washing cycle, then the pin will engage the outer periphery of the collar and rotation of the shaft 345 will continue until the notch registers opposite the pin where it will permit the mechanism to drop out of engagement, thereby pulling rod 262 so as to permit the mercury switches to drop and cut off current to controller.

During the increment movement of the formula disc, a bead chain 366 is being wrapped around the block 355, see Figs. 5 and 7. This chain runs over a pulley 367, and thence back and is connected to the supporting apparatus by a coil spring 368. When the driving cam 348 is disengaged from the gear 353, the energy stored in the spring 368 becomes effective to return the formula disc to the start position. A notch 357 is provided in the block into which a latch 369 is adapted to engage to index and stop the disc in the proper starting position. On rare occasions it may happen that an operator, when changing a formula, may remove a formula disc and again latch the plunger block without inserting a new disc. I have provided a safety switch, shown in Figs. 4 and 4d which is in circuit in the power line to the controller (see Fig. 22) and which renders operation of the controller motor impossible unless the disc is in place. Its operation is as follows. A mercury switch 201 is clipped to an arm 202 pivotally mounted at 203 on the rear wall of the controller housing. The arm carries a roller 204 which bears against the lower face of the disc, being held in this position by the spring 204a as shown in the dotted line position of Fig. 4d. In this position the switch is closed. While no disc is in place the arm pivots to the full line position of Fig. 4d and the circuit $L_1$ to the controller motor is broken. The controller motor cannot again be started until a disc is inserted.

*The water supply unit (B)*

I have provided means for opening the hot and/or cold water inlet valves through predetermined fractional amounts by means of a plurality of servomotors acting upon a fractionally advanceable valve in each inlet. Two positions are herein shown for each inlet, comprising half open and full open in each case, but if desired further subdivisions could be provided for. These features will now be described in detail, in conjunction with Figs. 1, 2, 3, 22a and 23.

The water supply unit comprises a header 371 into which are connected hot and cold water lines 376 and 377. The inlet chamber 372 is divided into two parts by a central wall 373. In the lower wall of the inlet chamber there is formed in each half a valve seat 374 and 375, respectively. A valve 378 works on the seat 374 controlling the admission of hot water to a mixing chamber 173, and a valve 379 works on the valve seat 375 controlling the admission of cold water to the mixing chamber 173. The construction of these valves is identical and a description of the one which is shown in section will suffice for both. The valve comprises the cylindrical body 380, the bottom face of which is provided with a sealing gasket 381 which registers with the valve seat. A nut 382 is provided to hold this gasket in position. The cylindrical wall of the valve extends upwardly into a cylinder 383 in the relationship of a piston to a cylinder. This cylinder is bored out to a close tolerance and the valve member is provided with a sealed ring 384. A coil spring 385 is interposed between the valve member 380 and the cylinder end 383 providing a bias to force the valve body against the valve seat. The cylindrical body is provided with one or more small holes or ports 386. The main purpose of this particular construction is to prevent water hammer and it is accomplished in the following manner.

We will assume that the inlet chamber 372 is filled with water and, due to the ports 386, the chamber 387, formed by the valve body and the cylinder 383, is also full. When the valve body is raised off of its seat, the water in the compartment 387 is forced out through the ports 386. When the valve opening means (motor 179) is released and the valve body begins to lower under the effect of the spring 385, the pressure of the water in the compartment 387 is temporarily relieved and immediately a vacuum begins to form in the chamber 387 and water from the inlet chamber 372 flows through the ports 386. The flow into the chamber 387 is, however, restricted by these ports so that full supply main pressure is not applied until after the valve body is seated.

The operating means for valve 378 is the double diaphragm motor 184 and the operating means for valve 379 is the double diaphragm motor 179 which has been previously described in connection with fluid circuits. The diaphragm 185 operates on a block 187, the upper face of which engages the diaphragm 186 which, in turn, operates on block 188. This block 188 is attached to the rod 389 which engages the stem of valve 378. The block 187 is flanged and its movement by the diaphragm 185 is limited by a stop flange 390 of the supporting structure. This movement represents one-half opening of the valve.

Application of air pressure to the diaphragm 186 permits full opening of the valve. The construction of the operating means of valve 379 is like that just described and the parts have been designated similarly, the rod which operates valve 379 being given number 391 and the stop flange on the supporting structure being given number 392.

The mixing chamber 173 is connected by a flange coupling 393 with the tub, as shown, in Figs. 1 and 2. The rear side of the mixing chamber connects with the conduit 172 through which washing supplies are conveyed.

From previous description in connection with the fluid circuits, it is understood that the air valves 82 to 85 control the operation of the water valves 378 and 379 and the multiple diaphragm motor 193 shuts down the controller motor during the admission of water, until the desired level is reached.

*Water level control unit (C)*

I have provided means for preselecting one of a plurality of liquid levels in the tub. By means of suitable plungers, acting through the jacquard element, and associated means, as will appear, a trip lever is advanced to active position. The setting of the lever, through related channels, supplies air to a float mechanism which is thereupon conditioned to be buoyed up by the water when admitted to the tub. The setting of the trip lever also admits air to the servomotors for the water-entry valves so that they may be activated when their appropriate plunger is indexed. When the water is turned on through the instrumentality of the jacquard mechanism the controller motor is temporarily cut off, as will appear. When the float rises and throws the trip lever at the proper level, the water-entry valves are deenergized, the water is cut off, the motor is re-started, and operation proceeds. This will now be explained in detail in conjunction with Figs. 1, 2, 19, 20, 21 and 23.

The general location of this apparatus is shown in Figs. 1 and 2. It comprises a float tank or chamber 395 which is connected to the tub of the washer by a pipe connection 396. The chamber contains a hollow float 397 open at the bottom. Fixed to the top of the float is a bracket 398 which supports three rods 399, 400 and 401. 399 and 401 are plain rods while the center one is a hollow tube which is closed at its upper end by a block 407 which forms a chamber in this tube upwardly into which extends a conduit 408 which is connected with the air conduit 98 (see Fig. 23).

Theaded in this block is another rod 405 which supplements 400 to provide a complete operating rod of given length. These rods 399 to 401 are of different lengths and are guided in vertical movement by tube 409, 410 and 411, respectively, and are adapted, respectively, to trip levers 412, 413 and 414 under certain conditions, when the float is caused to rise as the tub of the washer is filled with water, as will be later described. The different heights of the rods represent different water levels obtainable, for example, as follows: the center rod 400 gives a level of 5 inches. Rod 401 gives a level of 7 inches and 399 gives a level of 12 inches. The levers 412 to 414 and associated mechanism are supported by a bracket 415 carried, as shown, by the tank. These levers are L-shaped and are freely mounted on a shaft 416. Each is connected, respectively, to arms 417, 418 and 419 by links 420, 421, 422. The arms are freely mounted on a shaft 423 and extend rearwardly from the pivotal connection in a downwardly extending hook into actuating engagement with a yoke 424. This yoke has a spring biased plunger pin 425 at its one end which is adapted to actuate the stem of the valve mechanism 96. When any one of the levers 412 to 414 is moved to the level controlling position, dash-dot lines of Fig. 21, thus raising the respective arms 420 to 422, the said yoke is rotated clockwise and through the plunger pin, opens the valve 96. The valve 96, as will be seen from Fig. 23, controls the supply of air pressure to the bottom of the float chamber and to the air valves 82 to 85 which control the operation of the water supply valves 378 and 379. The operating means for the levers 412 to 414 are the servomotors 206, 208 and 210, respectively operated by jacquard plungers (15, 16, 17). The cylinders of these motors are bored in a cast block 426 and the pistons 207, 209 and 211 are biased to unoperated position by coil springs working in the cylinders. Said pistons move outwardly when air pressure is supplied rotating the respective one of the levers 412 to 414 counter-clockwise to the dash-dot line position where it remains as a result of the overcenter relation of its connection with the respective link 420 to 422. This apparatus operates as follows:

The formula disc selects the level; if this is plunger 17 then valve 81 is opened and servomotor 210 is supplied with air pressure and lever 414 is moved to the dash-dot line position. This operation opens valve 96 and air pressure is supplied to the conduit 408 in the float chamber and to the valves 82 to 85. When any of these valves, or a combination thereof, is operated to cause supply of water to the washer, the water entering the tub rises equally in the float chamber 395. In the meantime the air supply to the conduit 408 fills the hollow float 397 so that it is supported on the liquid in the chamber by the column of air therein which is continually supplied during the filling operation. As the level rises in the washer, the float rises and the end of rod 401 approaches the lever 414. When it engages, the lever is tripped, the valve 96 is permitted to close by disengagement of the yoke 424 from plunger 425, shutting off air supply to the valves 82 to 85 which results in the closing of the water supply valves 378 and 379. Simultaneously, the air supply to the hollow float is shut off and exhausted, and the float immediately drops, lowering the rods. The purpose of this construction is as follows:

It is impractical to set the level control by operation of any one of the valves 79 to 81 simultaneously with the operation of the valves 82 to 85 to supply water, because during the water supplying period, the controller is shut down by the associated diaphragm motor 193 so that if the valves 79 to 81 were operated at this time, the respective one of the servomotors 206, 208 or 210 would be maintained in operative position and the respective one of the levers 412 to 414 would also be held in operative position, and therefore, would not be tripped when the respective one of the rods 399 to 401 engaged the levers.

It is desirable that the setting of the level be performed simultaneously with the operation of the valve 77 to cause opening of the water discharge or dump valve. Therefore, unless the disappearing float is used, which immediately drops the respective level rods away from the levers 412 to 414, as soon as one of them is tripped, a next setting for a subsequent operation of the same level could not be performed because the first used rod would still be in the way.

In Fig. 21 there is shown in dotted lines, another servomotor 427. This is not used in the full automatic control but it is provided in the casting block 426 for use in connection with a type of control to be later described. The piston rod 428 of this motor engages a yoke member 429 pivotally supported on the shaft 416. This lies back of the depending branches of the levers 412 to 414. Its purpose is to provide a manual tripping of the levers 412 to 414 to manually rectify any error made by the operator in selecting the level.

Washing supplies unit (D)

Under the general heading of "supplies" I include such laundry necessities as soap, soda, bleach, sour, bluing, etc. They are carried in tanks adjacent the washing machine and in the preferred embodiment here described they are injected, by steam aspiration, into a mixing chamber communicating with the water inlet conduits. A system of check valves in the various supply pipes prevents accidental intermixing of the various supplies. My standard formulae call for the simultaneous admission of water with each charge of supplies and consequently, as above described, the controller is shut down while supplies and water enter the tub. The quantity of soap may be chosen at will from the soap tank by drawing liquid soap by steam aspiration from one of a plurality of open stand pipes of different heights which are immersed in the liquid soap. There is a jacquard plunger, corresponding to each stand pipe, which opens an air valve, said air valve in turn admitting steam to an aspirator nozzle in concentric arrangement with the outlets from the supplies tanks. The supplies other than soap must be replenished after each injection by pouring the requisite amount into the proper tank. As will be apparent on reading the specific description, a plurality of stand pipes could be arranged in the other tanks, as in the soap tank, but I have found the arrangement shown a simple and convenient one.

A specific description of the supplies unit follows which should be read in conjunction with Figs. 1, 2, 2a, 16, 17, 18 and 23. The diagrammatic arrangement of Fig. 23 shows the supplies tanks and conduits therefrom in partial perspective as seen from above, a little to the left of the center of the drawing, to show the varying heights of the stand pipes in the soap tank.

The supplies unit, designated D, is located as shown in Figs. 1 and 2, in and to the rear of the cabinet 430 on top of which is supported the controller unit A.

The tanks 159 to 162 are supported within the cabinet 430; the upper tank 159 contains the soap solution; the intermediate tank 160 contains the bleach solution, and the lower tank is divided by a partition into two tanks 161 and 162, containing sour and blue solutions, respectively. These tanks are preferably made of a composition material. As previously described, the soap tank is connected by five pipe lines 147, 149, 151, 153 and 155 through check valves 163 to 167 respectively, and through another check valve 175 and by way of pipes 171 and 172 to the mixing chamber of the water valve unit B. The tank 160 is connected by pipe line 156 through a check valve 168 and the check valve 175 by way of pipes 171 and 172 to the mixing chamber, and tanks 161 and 162 are connected by pipes 157 and 158 through check valves 169 and 170, a check valve 176 and pipes 174 and 172 to the mixing chamber. The supplies, respectively, are moved from the tanks into the mixing chamber by steam injection, steam for the operation of which is supplied through tubes 131, 133, 135, 137, 139, 141, 143 and 145 under the control of steam valves 122 to 129 operated by servomotors 114 to 121, respectively, the operation of which is controlled by the air valves 67 to 74 under plungers 1 to 8, respectively. The injectors 132, 134, 136, 138, 140, 142, 144 and 146 are identical and one is shown in cross-section detail in Fig. 18. This is conventional form and its operation is obvious. Steam is injected through the small tube or nozzle 439 creating a suction effect in the connection between the respective tanks and injector casings which draws the solution from the tank into the injector housing, and thence through the pipe lines into the mixing chamber of the supply valves. As indicated in the fluid diagram, Fig. 23, and as shown more in detail in Figs. 2 and 18, four of the pipe lines leading from the soap tank extend upwardly into the tank in the form of stand pipes 148, 150, 152 and 154. Each is provided with an opening in its side, as shown in Fig. 18, and this opening in the pipe 148 is at a level which will permit the injection of all of the soap in the tank above its level. The openings in the other stand pipes 150, 152 and 154 permit the injection of a given quantity from each as determined by the amount in the tank above the level of the opening in the pipe being used. The fifth connection pipe 155 is connected directly into the bottom and takes the remaining content of the tank. Thus, these pipes conduct five different quantities of soap to the washing machine.

Pipes 156, 157 and 158 connect into the bottom of tanks 160, 161 and 162 in the same manner as 155 connects with the soap tank.

For comparison of the actual construction and arrangement of this apparatus, as shown in Figs. 16 to 18, with the diagrammatic view shown in Fig. 23, 440 designates a supplies header which is divided by a partition, not shown, separating it into two sections 441 and 442. This separates alkali solutions from acid solutions. 443 is a steam header supplying all of the steam valves 122 to 129, and 444 is the steam supply; 445 is a steam trap.

Figure 2A:
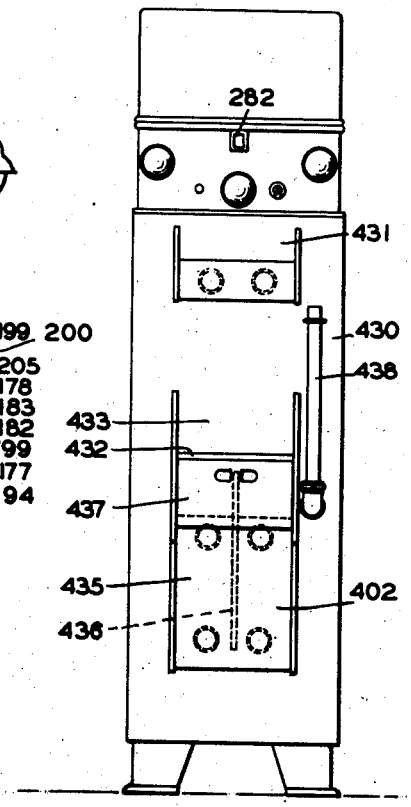
Fig. 2a is a front elevation of the cabinet supporting the controller unit A and the supplies injection apparatus D.

The cabinet 430 is designed for convenient introduction of washing supplies to the various tanks. Near the top, as shown in Figs. 2 and 2a, a trough 431 is provided which leads into the soap tank 159. Below this trough is a combination trough divided by a partition 432 forming two chambers, 433 and 434. The upper one, 433, leads into the bleach tank 160. The lower one, as shown in Fig. 2a, is divided by a partition wall 436. The left side 435 leads into the sour tank 161 and the right side 402 leads into the blue tank 162. Troughs 431 and 433 are open at the top and the trough 434 is provided with a hinged cover 437. The purpose of this cover is to prevent any possibility of alkali (soap or bleach) entering the tanks 161 and 162 if it is spilled during the filling of the soap and bleach tanks. 438 is a glass gauge to indicate the quantity of soap solution in the tank 159. Such means is not necessary for the other tanks because a definite quantity is usually supplied to these tanks.

*The temperature control unit (E)*

In my preferred embodiment the temperature control is based on the use of a plurality of thermostatic switches (two being shown) so placed as to respond to the temperature of the liquid in the tub. In the embodiment shown they are of the type which close two contact points when the temperature rises to the point for which the specific switch is set. Any convenient number of such switches may be used, set for respectively increasing temperatures. As a heating means I use live steam injected into the washing fluid directly, and the steam valve is opened by a jacquard plunger when the disc advances to the proper indexed position. As will be seen in the specific description following herewith, the controller motor is stopped by mechanism controlled by the identical plunger which admits the steam, and it remains stopped until the preselected switch (previously indexed into circuit by a jacquard plunger) closes. This switch completes the circuit to the controller motor, the disc is again started, the steam valve is closed, and normal operation proceeds. It is apparent that electric or other means can be substituted for steam by making changes which will occur on a study of my disclosure. It is further apparent that a variety of temperature responsive mechanisms could be substituted for my thermostatic switches while still following the present disclosure in principle. A more detailed description now follows, in conjunction with Figs. 1, 2, 4, 5, 22, 22a, and 23.

The temperature control unit, designated E, Figs. 1 and 2, comprises a valve 229 connected to the steam supply in line 130 by piping 446. This valve controls the flow of steam to the washer through piping 447 and 230 (see Figs. 1, 2 and 23). The valve is operated by a diaphragm motor 228, the flow of pressure fluid to which is controlled by the valve 76 operated by either one of the plungers 10 and 11, as shown in Fig. 23. This apparatus also includes the thermostatic switches 293 and 299 shown in Figs. 1 and 22. In describing the operation of this apparatus, we will assume that what has been designated the first temperature, for example 140° F., is desired. In this case, the plunger 10 is the operator means. This plunger engages the lever 319 which in turn engages the lever 341, see Figs. 6 and 7, and said lever engages the stem of the valve 76 permitting the flow of pressure fluid to the diaphragm motor 228 which opens the steam valve 229 admitting live steam to the washing casing.

Depression of the lever 319, and consequently the finger 309, (see Figs. 4 and 22a) rotates the switch arm 246, elevating the switch 237 causing it to close. By means of the branch 244 the switch lever 242 is also rotated elevating switch 236, causing it to close and through the branch 241 the lever 239 is rotated, elevating switches 234 and 235, causing the former to open and the latter to close. It will be understood that during the operation of the control, these two switches lie in the lower position and 234 is closed and 235 is open. This operation, as will be noted from Fig. 22, opens the circuit to the control drive motor 277 and the controller is temporarily shut down, the green light is extinguished and the red and amber lights are illuminated, indicating a temporary stop. When the temperature of the solution in the washer rises to the predetermined period, the thermostatic switch 293 closes, causing a circuit through the already closed switch 237 to the solenoid 294 which is energized and, as will be seen in Fig. 4, by means of its connection with the lever 253, causes it to be rotated counterclockwise. The branch 255 of lever 253 causes the bracket member 314 to be rotated to the dash-dot line position, as shown in Fig. 10, releasing the finger 309 from the switch lever 245; permitting it to drop and as a result thereof, to cause the other levers 239 and 242 to drop. Switches 234 to 237 are thereupon restored to the previous condition, that is, 234 is closed, 235 is opened, 236 is opened and 237 is opened. The motor 277 is reenergized, the green light is illuminated, indicating running period, and the red and amber lights are extinguished.

The operation above described is identical when the lever 321 is depressed for the second temperature or higher predetermined temperature. In this case, of course, the switch 238 and the thermostatic switch 299 are active. As will be noted in Fig. 1, a manual control is also provided for steam injection and temperature control. This valve 448 is operated at the front by an extended valve stem 449. This valve is in a by-pass line 450 which connects with the pipe 230.

*The discharge valve unit (F)*

In my preferred embodiment I use a discharge valve biased to open position but normally maintained in closed position by a fluid motor supplied with air, through intermediate fluid pressure devices, from the main air supply. When the proper jacquard plunger is registered and energized, the air is permitted to exhaust from said fluid motor, and the operative positions of said intermediate devices are reversed so as to permit the dump valve to open and discharge the liquid either to the drain or to suitable filtering mechanism for reuse. A detailed description of my preferred embodiment follows, to be read in conjunction with Figs. 1, 2, 4, 14, 15 and 23.

The discharge valve, as shown, is the self-opening type, and in the automatic control is held closed by air pressure supplied to the fluid motor 224 which is under the control of the valve 223. Valve 223 is operated by diaphragm motor 222, air supply to which is controlled by valve 220. Valve 220 is operated by a double diaphragm motor and mechanism 214 and 217, shown in Figs. 4 and 14, which will be described. Going back to the discharge valve and fluid motor, the piston of the motor is connected to the depending branch of a bell crank lever 452, the other branch of which is provided with extensions 454 into which are threaded pins which extend downwardly through holes in the yoke shaped end of a lever 455 pivoted at 456. The other end of this lever engages the body of the discharge valve 451. A coil spring is interposed between each extension of the bell crank 452 and each branch of the lever 455 and the force of the motor is applied to the valve body through this resilient connection. In Fig. 15, it will be noted that the lateral branch of the bell crank 452 is extended forward and has pivotally connected at its end a foot pedal 457, the upper part of which has pivoted to it a link 458 which is connected to a latch 459 which, when the valve is closed by foot application, is moved over a lug 453 on the bell crank. This is for foot operation if and when it is desired. It is used in a modified form described later.

Referring to Fig. 14, the double diaphragm motor 214—217 comprising diaphragms 215 and 218 and plungers 216 and 219, operate on a mechanism comprising a pair of levers 460 and 461. 460 is connected by a link 462 to form a toggle which is connected to an arm 463, pivotally mounted at 464 provided with a pin 465 adapted to engage the stem of the valve 220. The other lever is connected by a link 466 to the toggle link 462. As shown in Fig. 23, energization of motor 214 is controlled by valve 77, and 217 by valve 78.

In the position of the parts, as shown in Fig. 14, the valve 78 has been operated, energizing the motor 217 and the parts lie in the "discharge valve closed" position, the fluid motor 224 being energized under these conditions.

To open the discharge valve, the air valve 77 is operated. This energizes motor 214 which moves the toggle to the other side of center elevating the arm 463. This operation causes exhaust of the diaphragm motor 222 (see Fig. 15) which permits valve 223 to close, exhausting the air pressure from the motor 224, whereupon the discharge valve 451 moves to the discharge position. By means of the link 466, the lever 461 in this operation is placed in position for causing closing of the dump valve when the diaphragm motor 217 is energized.

To operate the self closing type of valve, the air connections to the diaphragms 214 and 217 would be reversed.

Operation

For the purpose of connecting the operations and functions of the above described units in a complete washing cycle, a commercially usable formula will be described.

Figure 4A:
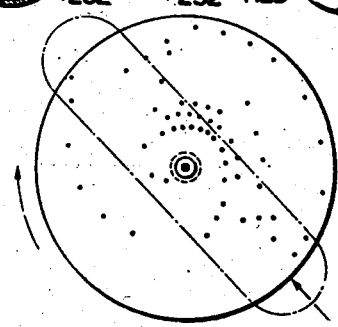
Fig. 4a is a small detail plan view of the formula disc shown in Fig. 5 and indicated in Fig. 4 by dash-dot lines.

A formula disc is first perforated in a definite pattern, for example, as shown in Fig. 4a to produce operations in a sequence according to the formula desired.

In operation, as previously described, this disc is rotated intermittently in small equal increments and each time it is indexed, perforations are registered with certain plungers and certain operations are initiated or performed. If the plate is blank at a particular indexing point, then no operations are performed at that period.

The drawings, for the most part, show the various mechanisms of the controller in operating positions. In Figs. 9 to 12 and 22 the positions of some of these parts when the control is shut down or out of operation is indicated by dash-dot lines.

To begin with, we will assume that the controller is shut down. Under these conditions, referring to Figs. 9 to 12 and 22a, the switches 234 and 235 lie in the elevated position; 234 is open and 235 is closed. Switches 236 to 238 lie in the lower position and are all normally open.

The formula disc driving mechanism lies in the dash-dot line position of Fig. 11, the driving cam 348 being disengaged from the gear 353 and the valve 100 is closed cutting off air supply to the plunger diaphragm. The formula disc is first inserted by releasing the latch 66 and raising the diaphragm supporting structure 59 around its pivotal connection 64, then removing the nut 358 dropping the formula disc over the stud into actuating engagement with the post 355, then securing it by the nut 358 and moving the diaphragm structure back to the latched position (see Fig. 5). The main air supply valve 47 is now opened supplying air pressure to the fluid circuits. Until this is done, the electrical circuits are open at the switch 274, see Fig. 22. Following this the washer is loaded with the goods to be washed and the motor 41 thereof set into operation by conventional means, not shown. Next the toggle switch 273 on the front panel of the controller would be closed. The only circuit energized at this point is that one for the red light 283 through the switch 235 (see Fig. 22) and for pilot light 281. The red light indicates control shut down.

To start operation of the control, the button 252 is now depressed. As described previously, this pulls forwardly on the rod 258, see Fig. 4, rotating shaft 260 which elevates the disc driving apparatus to the full line position of Fig. 11, where finger 337 latches back of the latch 333. Simultaneously the rod 262 is moved forwardly, moving the adjusting nuts 272, and permitting the switch lever 239 to drop to the full line position (see Figs. 9 and 22a) reversing the position of switches 234 and 235, closing the former and opening the latter. The red light is now extinguished and a circuit is established as shown in Fig. 22 for the controller drive motor 277 and for the green light 282 which light indicates controller in operation.

Immediately as the motor 277 is energized, the cam shaft 345 (Figs. 11, 12 and 13) is set into operation. As the point of energization, the cams on this shaft are in the position as shown in Figs. 12 and 13.

When the part 351—352 of the cam meshes with the gear 353, the formula disc is rotated to the first indexing position. Following this, the cam 347 actuates the lever 359 rotating it clockwise to open the valve 100, supplying air pressure to the chamber 45 of the diaphragm which immediately causes the diaphragm 49 to move the plungers downwardly.

In the particular formula to be now described, the plungers operated in this first indexed position are No. 14 and No. 16. No. 14 opens valve 78 which, as will be understood from referring to Fig. 23 and previous description, energizes fluid motor 224 which closes the discharge valve 451. No. 16 opens valve 80 which energizes servomotor 208 thereby energizing the water level apparatus to set the mechanism for a 5 inch water level.

When the roller 360 of the lever 359 drops off of the cam 347 (see Fig. 13) the valve 100 is closed, the diaphragm chamber 45 is exhausted and the plunger returns. As previously described during the next one-quarter revolution of the cam shaft 345, nothing happens, at the end of which movement the parts 351 to 352 of the cam 348 again comes into action and the before described indexing operation is repeated; the formula disc moves to the second indexing point and again operates the diaphragm as before described. This time the perforations in the disc register opposite plungers 19, 21 and 1, and the valves 83, 85 and 67, respectively are operated, valves 83 and 85 supplying air pressure to the water supply valve mechanism to fully open the hot and cold water valves 378 and 379. At the same time, diaphragm motor 193 is energized, which, as previously described (see Figs. 8 and 23) rotates the switch shaft 249 and thereby, through the pin connection with the switch lever 242, elevates the switch 236, closing it, and through the branch 241, rotates the switch lever 239, elevating switches 234 and 235. As will be seen in Fig. 22, this operation opens switch 234, shuts down the controller drive motor, 277 and extinguishes the green light. The closing of switch 235 energizes the red light, and the closing of switch 236 energizes the amber light. This is a temporary stop of the controller during the water filling period and is indicated by the illumination of the red and amber lights. When the water level in the tub reaches the 5 inch level, the lever 413 is tripped, and the valve 96 is closed, exhausting the air supply lines to the float apparatus and to the valves 83 and 85 which causes float to drop since water displaces the residual air, and the water supply valves to close.

Simultaneously with the operation of the valves 83 to 85, the valve 67 is operated which supplies air pressure to the washing supplies injection apparatus which causes a quantity of soap from the soap tank lying above the standpipe 148 to be injected into the mixing chamber of the water valve and thence into the tub with the water. When the desired water level is reached, and the diaphragm motor 193 is exhausted, the previous positions of the switches 234, 235 and 236 are restored, again starting the controller motor 277, lighting the green light and extinguishing red and amber.

In the next indexing position of the formula disc, valve 81 is operated, energizing fluid motor 210 which sets the lever 414 for a 7 inch level. Since there is already a 5 inch level in the tub, this setting will add 2 inches to give a total of 7 inches.

In the next indexing position, valves 83 and 85 are again opened, causing the full opening of water valves 378 and 379 and the controller is again shut down through the action of the diaphragm motor 193, until the said 7 inches is reached. Simultaneously with the operation of valves 83 and 85 the valve 68 is operated which causes the injection of soap from the tank 159 above the stand pipe 150.

Following this, the next indexed position permits plunger 9 to operate the valve 75 which supplies air to the audible signal whistle 232. The operation of the plunger 9 at this point also depresses the lever 317 which, through finger 308, rotates the switch lever 242 and through branch 241 rotates switch lever 239 causing the switches 234, 235 and 236 to be elevated, shutting down the controller motor, extinguishing the green light and energizing the red and amber. This is an intermediate stop and it is provided at this point in the cycle so that the operator may make an inspection to see that a sufficient quantity of soap has been delivered for proper cleansing action in this first bath. If it is an exceptionally dirty load, the suds will be lower and more soap may be added manually through the supply door furnished on the washing machine.

After inspection by the operator and performance of such manual operations as may be required, he depresses the push button 252 which, through finger 255, rotates the bracket 314, releasing the finger 308 from the switch lever 242 and normal conditions are again restored, for continued operation of the control.

In the next few indexed positions of the disc, dependent upon the running time desired for the first bath, the formula disc is blank.

Following this running period, the next indexed position of the disc permits operation of valve 77 which causes exhaust of the fluid motor 224 and the discharge valve opens. Simultaneously, valve 80 is opened, energizing servomotor 208 which sets lever 413 for a 5 inch water level. The following indexed position opens valve 78 which causes closing of the discharge valve and simultaneously the valve 85 is opened which causes the full opening of hot water valve 378 and, at the same time, valve 69 is opened which causes the injection of soap from the soap tank 159 above the stand pipe 152.

Following a running period for the second bath, the next indexed position of the disc permits opening of the valve 77 which causes opening of the discharge valve, and at the same time, the valve 80 is opened to set the water level apparatus for another 5 inch water level.

The next indexed position opens valve 78 causing the discharge valve to be closed and simultaneously opens the valve 85 again opening the hot water valve 378 and, at the same time, opens valve 70 for the injection of the soap from the tank 159 above the stand pipe 154. As in all the previous cases, during the admission of water, the controller is shut down and is again started when the level reaches the desired point.

The next indexed point permits operation of the plunger 10. This controls a predetermined temperature. It depresses the lever 319 which opens the valve 76 which in turn opens the steam valve 229 admitting steam to the tub. The operation of the lever 319 through the finger 309 elevates the switch 237 causing it to close. Through the branch levers 244 and 241 the switches 234, 235 and 236 are also elevated, opening 234, closing 235, and closing 236. This shuts down the controller drive motor 277, extinguishing the green light and energizing the red and amber lights, indicating a temporary stop of the controller. When the temperature of the bath rises to the predetermined point, for example 140° F., the thermostatic switch 293 closes, which causes energization of the solenoid 294 thereby rotating the lever 253. Lever 253, through branch 255, rotates the bracket member 314, releasing the finger 309 from the switch lever 245, permitting the switches 234 to 237 to again drop. This restores operation of the controller, extinguishes the red and amber lights and illuminates the green one.

Following this, there is another running period after which the next indexed position again operates valve 77 to open the discharge valve and valve 80 to set the apparatus for another 5 inch level.

The next indexing position opens valve 85 to supply hot water, opens valve 71 to inject the remaining soap in the tank 159 and simultaneously opens valve 78 to close the discharge valve. In this bath another and a higher predetermined temperature is effected. This is controlled by the plunger 11 which operates on lever 321 and valve 76, again opening the steam valve 229 and admitting steam to the tub. The operation of the lever 321 elevates the switches 234, 235, 236 and 238 and, as before, the controller is shut down, the red and amber lights are illuminated and when the thermostatic switch 299 closes, the solenoid 294 is energized, restoring operation of the controller.

In a commercial formula a considerable number of further operations are indexed and performed but the rather extensive description so far given indicates the nature of the operation and the functioning of the various mechanisms of the control units. We proceed to the final operations.

In the next to the last indexed position of the formula disc, the air valve 77 is opened for opening of the discharge valve, and in the last indexed position the plunger 12 trips the latch 333. This drops the cam shaft 345 to the dash-dot line position, disconnecting the drive, as shown in Fig. 11, and positions the switches to shut down the controller and at the same time operates the lever 340, (Fig. 7) to open the valve 75 energizing the whistle to audibly signal the end of the washing cycle.

The intermediate stop may be used at any point in the washing operation where it may be desirable. The formula disc in the embodiment as actually used is designed for 95 indexed positions which is sufficient to accommodate a maximum number of operations in any washing formula.

The above is a typical formula in use, and by properly perforating the disc any sequence of operations may be obtained.

*Modified forms of the invention*

It is apparent that certain substantial advantages of my invention may be achieved without utilizing the completely automatic features in combination as disclosed hereinabove. I may, for instance, inject the washing supplies manually, but control all other operations of the formula through the controller and jacquard element. This can easily be arranged by omitting the air valves 67 to 74, the injection apparatus 116 to 121, the steam lines and valves 122 to 129 and the associated mechanism for injecting the supplies. In this modification the jacquard element indexes an intermediate stop and gives an audible and visible signal to indicate to the operator that it is time to manually inject the supplies. When finished he presses the starting button 252 and the controller resumes operation.

A somewhat different modification is shown in Figs. 24 to 31 and will now be described. In this modification I control the supply of hot and cold water, the water level, and the discharge valve without recourse to the jacquard mechanism. The various operations are instituted by manually operated push buttons and cycles are terminated by automatic timing means. The construction of and relationship between water valves and water level apparatus is the same as in the main embodiment shown in Figs. 1 to 23. A specific description follows.

Figure 24:
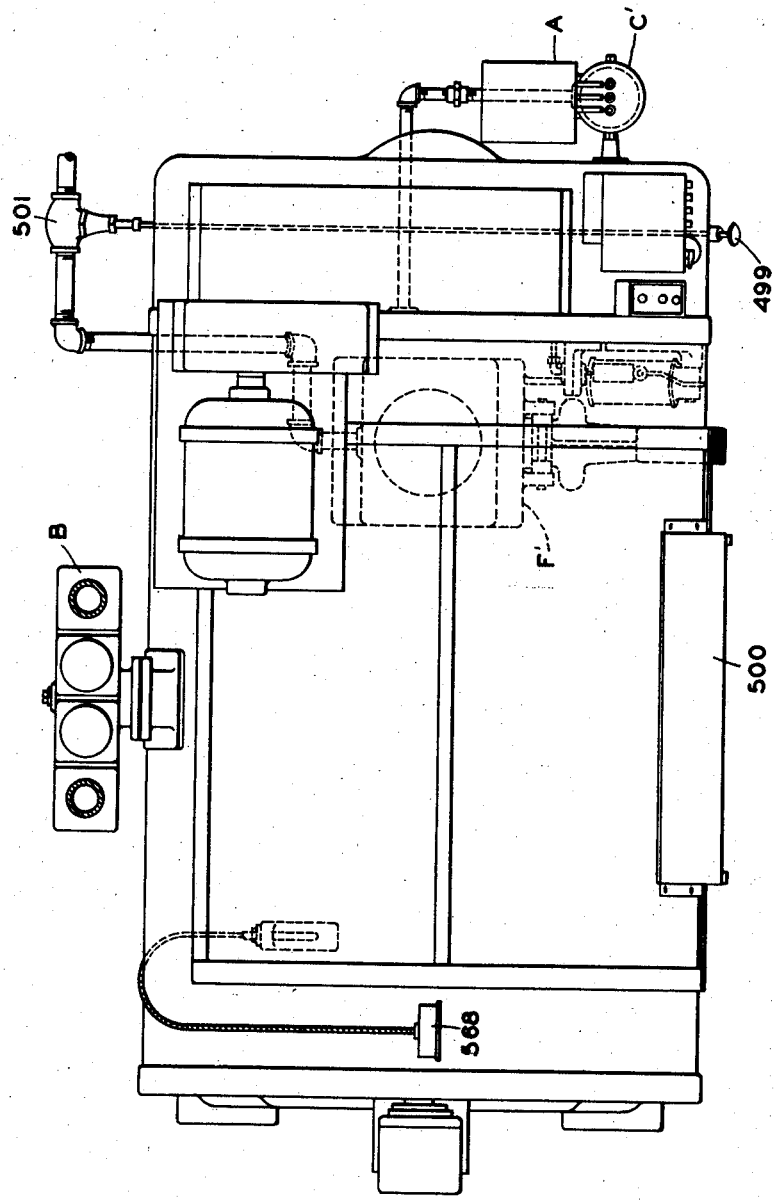
Fig. 24 is a plan view of a washing machine showing the several units making up the control apparatus for a modified form of control hereinafter referred to as the push button automatic type.

Fig. 24 shows the position of the units making up this control. A' represents the controller; B' is the water supply unit which is exactly like that used in the full automatic control previously described. C' is the water level apparatus which also is like that used in the full automatic, previously described. F' designates the discharge valve apparatus which is also like that of the full automatic. It will be noted that corresponding letters with the prime suffix has been given to these units for comparison with the full automatic disclosure.

This control employs a timer switch 503. Its function is to automatically terminate operations which are initiated by manual operation of the various push buttons. This timer is a conventional clock type. It is set to operate by moving the pointer around the dial to the point indicating the time increment desired. It is connected in circuit so that when the pointer returns to the zero position, certain circuits are set up.

As shown in Fig. 31, L—1 is connected through a snap switch 504 by wire 505 to a solenoid 506. From the solenoid it is connected to one terminal of a mercury switch 507 and from the other terminal of this switch by wire 508 to the center terminal of the timer switch 503 and from the other terminal of the timer switch, at zero setting, by wire 509 back through the snap switch to L—2. A signal light 510 is connected across the lines through the said timer switch 503 and is illuminated when the timer is at zero position indicating to the operator that the operation, whatever it may be, has been completed.

The controller employs a diaphragm operator 511 comprising a chamber 512 to which air is supplied and a diaphragm 513 which is adapted to actuate a block 514 supporting plungers 515, 516, 517 and 518.

As shown in Fig. 28, these plunger rods extend freely through holes in the block member and are provided with a nut on the lower ends to maintain connection therewith. To the upper ends of these rods are secured abutting blocks interposed between which and the block member 514 are coil springs 519 to 522 inclusive. These plungers engage, respectively, with levers 523 to 526 pivotally mounted, respectively, on the diaphragm housing at 523, as shown in Fig. 27. These levers, respectively, are normally held down by latches 527 to 530. These latches are pivotally mounted at 531, as shown in Fig. 27, and each latch has a depending branch which is adapted to be engaged, respectively, by push buttons 532 to 535. The latches are normally biased to the latched position by springs 536. When air pressure is applied to the diaphragm 513 and the block 514 is raised, the springs 519 to 522 are compressed, and when any of the push buttons 532 to 535 are depressed releasing the respective latches, the energy stored in the spring acting upon the respective plunger rod rotates the respective ones of the levers 523 to 526 clockwise. A pair of springs 537 is provided to bias the block 514 to the downward position and to return it when air is exhausted from the diaphragm chamber.

The levers 523 to 526 engage, respectively, with the stems of the combination valves 538 to 541. These valves are mounted on a block 542 and are connected to a passage 543 for air pressure supply. The diaphragm chamber is connected to a passageway 544 for air pressure supply. The delivery connections of the valves 538 and 539 are connected, respectively, to the diaphragms 185 and 186 of the hot water supply valve. Delivery connections of valves 540 and 541 are connected respectively, to the diaphragms 180 and 181 of the cold water valve.

Located in the lower part of the controller casing are three combination valves 545, 546 and 547. These are supported by the block 542 and receive air pressure supply from a passage 548. These valves are operated, respectively, by the push buttons 549, 550 and 551. The delivery connections of these valves are connected respectively to the servo-motors 206, 208 and 210 of the water level apparatus by conduits 552 to 554.

Another combination valve 555 controls air pressure supply to the servo-motor 427 which was described in connection with Fig. 21 of the full automatic control. This valve is operated by a push button 556. The purpose of this mechanism is to reset the level apparatus if error is made by the operator. It will be remembered that energization of this motor operates on the yoke member 429 which is pivotally supported on the shaft 416 and lies back of the depending branches of the levers 412 to 414 and manually trips whichever one of these levers was set in error.

Another valve 557 controls air pressure supply to the diaphragm motor 222 which in turn controls the operation of valve 223 controlling air pressure supply to the dump valve operating fluid motor 224. This valve is operated by a push button 558. Depressing this button energizes the apparatus described to close the dump valve.

As shown in Fig. 29, this button is provided with a shoulder 559 which, when the button is depressed, engages a latch lever 560 which holds it depressed with the valve 557 in actuated position (dash-dot line position). As shown in Fig. 30, this latch lever has a branch 561 which is connected with the armature of the solenoid 506. When this solenoid is energized, the latch 560 is disengaged from the shoulder 559, permitting the button 558 to return and valve 557 to close, causing exhaust of the fluid motor 224 to open the discharge valve. If it is desired to open the dump valve prior to the automatic operation, the push button 563 is depressed. This, as shown in Fig. 30, engages another branch 562 of the latch lever which rotates it out of engagement with the shoulder 559 and permits the valve 557 to close.

The latch lever 560 also supports the mercury switch 507 so that when push button 558 is depressed to cause closing of the dump valve, the said mercury switch is closed.

Figure 25:
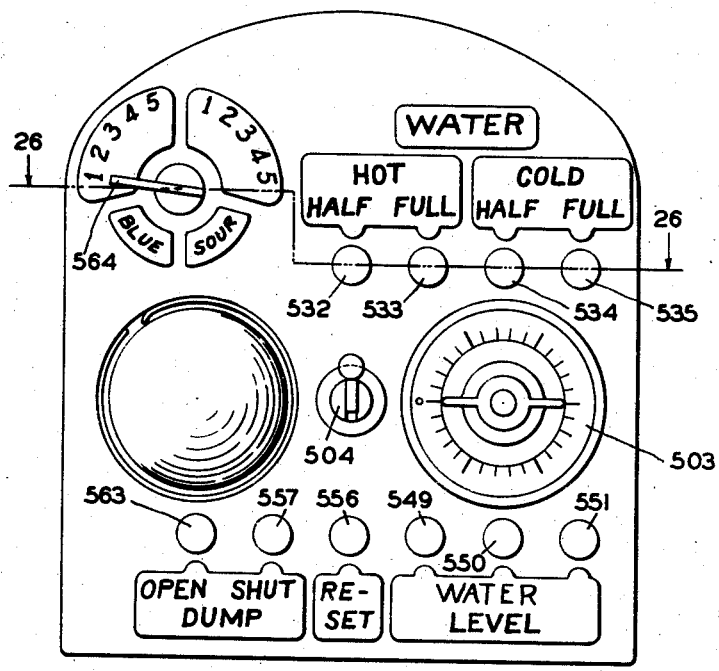
Fig. 25 is a front elevation of the control panel for the said modified form of control.
Figure 26:
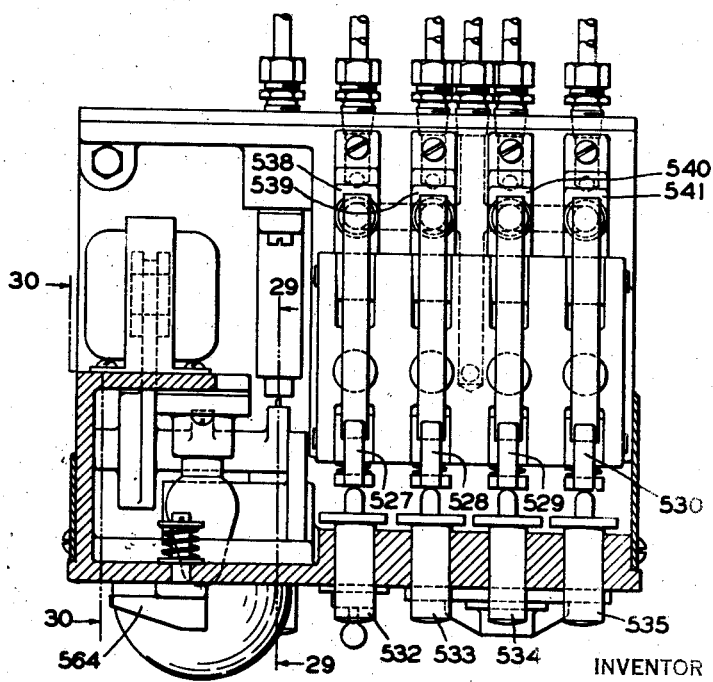
Fig. 26 is a plan view of Fig. 25 with the cover removed and the front panel being shown in section on the line 26—26 of Fig. 25.

The front panel of the controller has a pointer 564 and a dial marking 565 in the upper left hand corner thereof, as shown in Fig. 25. This is only an indicating device which is used by the operator as a record of what operation is being performed at the time, for example, the section of the dial at the upper left numbered 1 to 5 may represent suds and bleach baths. The numbers 1 to 5 at the upper right may indicate rinse baths, and the lower markings as indicated, represent blue and sour baths.

In the operation of this type of control, it should be understood that the same formula may be followed, as described in the full automatic. In this case however the selection of the water level, the initiation of operation of water supply valves and dump valve, and the manual injection of washing supplies and the control of the temperature is up to the operator. The water supply valves are automatically shut off when the preselected level is reached and the dump valve is automatically opened at the end of the bath period. The time duration of each bath is controlled by the timer switch which is pre-set by the operator. The following is a brief description of the procedure.

Assuming that the air supply valve 566 has been opened, supplying air pressure to the fluid circuits and that the snap switch 504 has been closed and the dump valve 451 is open, it is necessary, first of all, for the operator to depress one of the push buttons 549 to 551 to set the level. Assume that a 7 inch level is desired. The operator then depresses button 551. This energizes servomotor 210 setting the lever 414 which causes opening of the valve 96 supplying air pressure to the diaphragm chamber 512 and to the air valves 538 to 541. Next the operator sets the timer switch 503 for the desired time period of the bath. This opens circuit to the solenoid 506 which, at this time, is also open at the mercury switch 507. Next he depresses the push button 558, which closes the dump valve and which, at the same time permits closing of the mercury switch 507. Assume that for this first bath it is desired to have hot and cold water valves fully opened; he then depresses buttons 528 and 530, releasing latches 528 and 530, permitting the operation of the water inlet valves 539 and 541 which supplies air to diaphragms 186 and 181. When the float 397 rises and trips the lever 414, the valve 96 closes exhausting the diaphragm chamber 512 which permits springs 567 to return levers 524 and 526 to latched position permitting the valves 539 and 541 to close and the hot water valves therefore to close.

After opening the hot and cold water valves, he injects the proper washing supplies into the tub through the supply door 500. During this or any following bath the temperature may be controlled by manually adjusting the stem 499 of the steam valve 501. The temperature is indicated by a thermometer 568 which is connected to a bulb in the tub as shown in Fig. 24.

When the timer switch reaches the zero position, the circuit to the solenoid 506 is closed energizing the solenoid which rotates the latch, releasing the push button 558 permitting the valve 557 to close, exhausting the diaphragm motor 222 which causes the fluid motor 224 to be exhausted and the dump valve to open. The mercury switch 507 is opened which then causes the solenoid 506 to be deenergized. At this point, which represents the end of the bath, the light 510 is illuminated. The operator then sets the controls for the second bath, etc.

The interrelated water valve and water level control alone may be adopted in commercial washing systems by reason of the obvious advantages incident thereto. It can be operated manually by setting the proper trip lever for the desired level and opening the water entry valves by depressing the push button as described immediately above. When the water reaches the desired level, the trip lever operation causes the air valves to be closed which closes the water supply valves. All other operations, including liquid discharge, supplies injection, and temperature control could be controlled in any standard manner.

In the appended claims the term "operative means therefor," when used in conjunction with the term "washing machine," refer to any operating mechanism for any conventional washing machine to which my improved control apparatus may be applied.

What I claim is:

1. In a washing machine of the class described, a formula controller for controlling all operations of the washing machine, a conduit for supplying detergent liquid, a normally closed valve in said conduit, and a plurality of separate control means, each thereof being sensitive to operation of said controller and operatively associated with said valve to automatically open it at any desirable preselected time during the washing cycle, the several control means being arranged, when operated, respectively to open the valve different amounts.

2. In a washing machine of the class described, means for delivering washing fluid to said washing machine, automatic means for preselecting a desired liquid level in said washing machine, and means responsive to operation of said level selecting means for energizing said washing fluid delivery means.

3. In a washing machine of the class described, a conduit for the entry of washing fluid to said washing machine, a control valve in said conduit, means for preselecting a desired liquid level in said washing machine, means responsive to operation of said level selecting means for causing operation of said control valve, and individually operatable control devices for opening said valve predetermined different amounts.

ANGUS F. HANNEY.